(12) United States Patent
Lee et al.

(10) Patent No.: US 12,341,940 B2
(45) Date of Patent: Jun. 24, 2025

(54) SYSTEM AND METHOD FOR MEASURING DEPTH OF STEREOSCOPIC IMAGE

(71) Applicants: SAMSUNG DISPLAY CO., LTD., Yongin-si (KR); UNIVERSITY-INDUSTRY COOPERATION GROUP OF KYUNG HEE UNIVERSITY, Yongin-si (KR)

(72) Inventors: Ha Young Lee, Yongin-si (KR); Sung Wook Min, Seoul (KR); Young Rok Kim, Hwaseong-si (KR); Jae Joong Kwon, Yongin-si (KR); Jin Seo, Yongin-si (KR)

(73) Assignees: SAMSUNG DISPLAY CO., LTD., Yongin-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 163 days.

(21) Appl. No.: 18/358,532

(22) Filed: Jul. 25, 2023

(65) Prior Publication Data
US 2024/0089420 A1    Mar. 14, 2024

(30) Foreign Application Priority Data
Sep. 13, 2022 (KR) .................. 10-2022-0114775

(51) Int. Cl.
*H04N 13/106* (2018.01)
*G03H 1/10* (2006.01)
*H04N 13/00* (2018.01)

(52) U.S. Cl.
CPC ............. *H04N 13/106* (2018.05); *G03H 1/10* (2013.01); *H04N 2013/0081* (2013.01)

(58) Field of Classification Search
CPC ......... H04N 13/106; H04N 2013/0081; H04N 13/271; H04N 13/327; H04N 13/305;
(Continued)

(56) References Cited

U.S. PATENT DOCUMENTS

| | | | |
|---|---|---|---|
| 6,795,241 B1* | 9/2004 | Holzbach | G02B 3/0056 |
| | | | 348/E13.028 |
| 10,721,462 B2* | 7/2020 | Park | H04N 13/317 |

(Continued)

FOREIGN PATENT DOCUMENTS

| | | | | |
|---|---|---|---|---|
| JP | 6657111 | | 3/2020 | |
| KR | 20190122504 A | * | 1/2019 | ............... G03H 1/04 |

(Continued)

*Primary Examiner* — Thai Q Tran
*Assistant Examiner* — Stephen R Smith
(74) *Attorney, Agent, or Firm* — F. CHAU & ASSOCIATES, LLC

(57) ABSTRACT

A system for measuring a depth of a stereoscopic image includes a display device displaying a stereoscopic image at a predetermined depth of field; a holographic camera generating an interference pattern image by sensing a wavelength and a phase of light of the stereoscopic image; and a control unit calculating a plurality of modulated image data having image information of the stereoscopic image at each depth of the plurality of depths based on the wavelength and the phase of the light, calculating edges of a field in each of the plurality of modulated image data to obtain edge detection values, calculating a modulated signal by arranging the edge detection values according to a depth in the each of the plurality of modulated image data, calculating a first maximum value of the modulated signal, and calculating a first depth corresponding to the first maximum value as the depth of field.

20 Claims, 23 Drawing Sheets

(58) Field of Classification Search
CPC ........ H04N 13/395; H04N 13/39; G03H 1/10; G03H 2001/0436; G03H 2001/0447; G03H 1/0443; G03H 2001/0033; G03H 2001/0038; G03H 2001/0458; G03H 2001/0883; G03H 1/0005; G06T 7/13; G06T 7/593
USPC ...................................................... 348/40, 42
See application file for complete search history.

(56) References Cited

U.S. PATENT DOCUMENTS

| | | | | |
|---|---|---|---|---|
| 2009/0141022 | A1* | 6/2009 | Kimpe | H04N 13/327 345/419 |
| 2009/0141121 | A1* | 6/2009 | Kimpe | H04N 13/327 348/E13.001 |
| 2012/0044320 | A1* | 2/2012 | Spivey | G03H 1/0443 348/40 |
| 2019/0327394 | A1* | 10/2019 | Ramirez Luna | A61B 34/77 |
| 2020/0120328 | A1* | 4/2020 | Hamilton | H04N 13/117 |
| 2020/0364899 | A1* | 11/2020 | Liu | G06T 7/85 |
| 2021/0116863 | A1* | 4/2021 | Stahl | G03H 1/265 |
| 2021/0216039 | A1* | 7/2021 | Wenus | G03H 1/0005 |
| 2022/0179359 | A1* | 6/2022 | Pi | G06T 7/536 |
| 2022/0221822 | A1* | 7/2022 | Kim | H04N 5/2628 |
| 2024/0045375 | A1* | 2/2024 | Shimoda | G01B 9/02047 |

FOREIGN PATENT DOCUMENTS

| | | |
|---|---|---|
| KR | 10-2019-0122504 | 10/2019 |
| KR | 10-2040629 | 10/2019 |

\* cited by examiner

30: 100, 600, 700
700: 701, 711

SYSTEM AND METHOD FOR MEASURING DEPTH OF STEREOSCOPIC IMAGE

CROSS-REFERENCE TO RELATED APPLICATION

This application claims priority under 35 U.S.C. 119 to Korean Patent Application No. 10-2022-0114775, filed on Sep. 13, 2022, the disclosure of which is incorporated by reference herein in its entirety.

TECHNICAL FIELD

Embodiments of the present disclosure relate to a system and method for measuring a depth of a stereoscopic image.

DESCRIPTION OF THE RELATED ART

Three-dimensional (3D) stereoscopic image technology is broadly categorized into two methods: glasses-wearing method and glasses-free method. The glasses-wearing method provides different images to left and right eyes of an observer, creating a sense of depth due to the parallax between the two eyes. This method may be further divided into two sub-methods: polarized glasses method and shuttle glasses method. The glasses-free method uses a parallax method to display different images to the left and right eyes of the observer without requiring glasses. This method includes a volumetric method for continuously reproducing a direct image, such as lenticular, parallax barrier, parallax illumination, as well as a cross-sectional image of an object to generate a 3D image in space. Another glasses-free method is the holographic method, which records and reproduces wavefront information of a 3D object. A holographic camera may be used to record a stereoscopic image.

The holographic camera is used to record a three-dimensional image on a surface similar to photographic film, through the interference effect of light that occurs when two laser beams meet. To record a stereoscopic image, the holographic camera uses a laser beam to reflect an object wave from an object in one direction and meet another laser beam from a different direction. Unlike a general photographic technology that records only intensity information of light, the holographic camera captures and records amplitude and phase information of light that propagates from an object. As a result, the holographic camera stores an interference fringe according to a phase difference between object waves reflected from different parts of the object when the lights of two directions meet. The amplitude and phase of the object are recorded together in the interference fringe.

SUMMARY

Aspects of the present disclosure provide a system and method for measuring a depth of a stereoscopic image capable of calculating a depth of field of an object displayed in the stereoscopic image.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to embodiments of the present disclosure, a system for measuring a depth of a stereoscopic image includes a display device displaying a stereoscopic image at a predetermined depth of field in a three-dimensional space, wherein the stereoscopic image has a plurality of depths in the three-dimensional space; a holographic camera generating an interference pattern image by sensing a wavelength and a phase of light of the stereoscopic image; and a control unit calculating a plurality of modulated image data having image information of the stereoscopic image at each depth of the plurality of depths based on the wavelength and the phase of the light, calculating edges of a field in each of the plurality of modulated image data to obtain edge detection values, calculating a modulated signal by arranging the edge detection values according to a depth in the each of the plurality of modulated image data, calculating a first maximum value of the modulated signal, and calculating a first depth corresponding to the first maximum value as the depth of field.

Each of the plurality of modulated image data may have a plurality of gray level values. The control unit may calculate the edges of the field by calculating gray level values having a value greater than or equal to a first threshold value as the edge detection values in each of the plurality of modulated image data.

At least one of the plurality of modulated image data may have three or more gray level values.

The control unit may further calculate sub-edges of the field by calculating gray level values having a value greater than or equal to a second threshold value different from the first threshold value as sub-edge detection values in each of the plurality of modulated image data.

The second threshold value may be greater than the first threshold value.

The control unit may further calculate a sub-modulated signal by arranging the gray level values of the sub-edges according to the depth.

The control unit may calculate a second maximum value of the sub-modulated signal, and may calculate an average value of a second depth corresponding to the second maximum value and the first depth as the depth of field.

The control unit may calculate the modulated signal by sequentially arranging the gray level values of the edges according to the depth.

Each of the modulated image data may include a plurality of image areas each having gray level values. In case that a gray level value of at least one image area of the plurality of image areas is greater than or equal to a first threshold value, the control unit may calculate the at least one image area as the edge.

The edge may be adjacent to an image area in which the gray level value of the at least one image area of the plurality of image areas is smaller than or equal to the first threshold value.

The control unit may normalize the modulated signal so that the first maximum value of the modulated signal becomes 1, and may calculate the first maximum value as 1. The control unit may calculate a depth allowing the modulated signal to have a value of 1 as the depth of field.

The holographic camera may comprise an image sensor obtaining the interference pattern image in a plurality of light receiving areas that are divided, and a micro polarizer array disposed so that linearly polarized light having different phases is received for each of a plurality of divided areas of the light receiving area in order for the image sensor to obtain the interference pattern image.

The micro polarizer array may include a plurality of polarizers. Each of the plurality of polarizers may be arranged to correspond to each of the plurality of light receiving areas of the image sensor and may convert transmitted light into linearly polarized light.

Light transmission axes of the respective polarizers may be formed to have different angles, such that linearly polarized light passing through the respective polarizers may have different phases.

According to embodiments of the present disclosure, a method for measuring a depth of a stereoscopic image includes obtaining an interference pattern image by sensing a wavelength and a phase of light according to a depth of a plurality of depths of a stereoscopic image displayed at a predetermined depth of field in a three-dimensional space; calculating a plurality of modulated image data having image information of the stereoscopic image for each depth of the plurality of depths based on the wavelength and the phase of the light of the interference pattern image; calculating edges in each of the plurality of modulated image data to obtain edge detection values; calculating a modulated signal by arranging the edge detection values according to a depth in the each of the plurality of modulated image data; calculating a first maximum value of the modulated signal; and calculating a first depth corresponding to the first maximum value as the depth of field.

The calculating of the first maximum value of the modulated signal may comprise normalizing the modulated signal so that the first maximum value of the modulated signal becomes 1, and calculating the first maximum value as 1.

In the calculating of the edges in each of the plurality of modulated image data, each of the plurality of modulated image data may have a plurality of gray level values, and the edges of the field may be calculated by calculating gray level values having a value greater than or equal to a first threshold value as the edge detection values in each of the plurality of modulated image data.

In the calculating of the edges in each of the plurality of modulated image data, sub-edges of the field may be further calculated by calculating gray level values having a value greater than or equal to a second threshold value different from the first threshold value as sub-edge detection values in each of the plurality of modulated image data.

In the calculating of the modulated signal by arranging the edge detection values of the edges according to the depth, the modulated signal may be calculated by sequentially arranging the gray level values of the edges according to the depth. A sub-modulated signal may be further calculated by sequentially arranging the gray level values of the sub-edges according to the depth.

The method for measuring a depth of a stereoscopic image may further comprise calculating a second maximum value of the sub-modulated signal, and calculating an average value of a second depth corresponding to the second maximum value, and the first depth is calculated as the depth of field.

With a system and method for measuring a depth of a stereoscopic image according to an exemplary embodiment, it is possible to calculate a depth of field of an object displayed in the stereoscopic image by calculating a modulated signal for each depth from an interference fringe obtained with a holographic camera.

The effects of embodiments of the present disclosure are not limited to the aforementioned effects, and various other effects are included in the present specification.

BRIEF DESCRIPTION OF THE DRAWINGS

The above and other aspects and features of embodiments of the present disclosure will become more apparent by describing in detail exemplary embodiments thereof with reference to the attached drawings, in which.

DETAILED DESCRIPTION OF THE EMBODIMENTS

Figure 1:
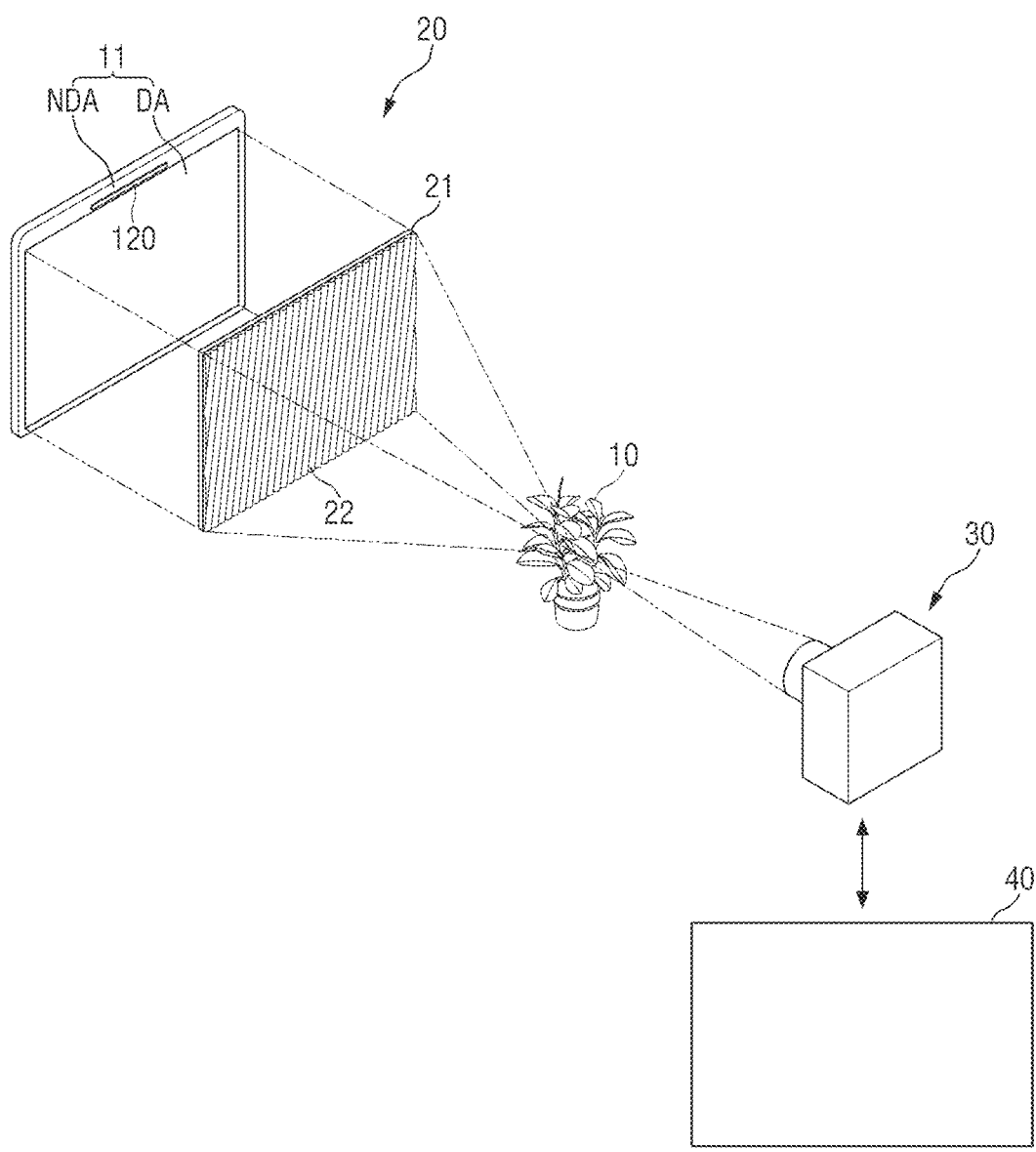
FIG. 1 is a perspective view illustrating a system for measuring a depth of a stereoscopic image according to an exemplary embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the embodiments of the disclosure disclosed herein. It is apparent, however, that various embodiments may be practiced without these specific details or with one or more equivalent arrangements. In other instances, structures and devices are shown in block diagram form in order to avoid unnecessarily obscuring various embodiments. Further, various embodiments may be different, but do not have to be exclusive nor limit the disclosure. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, ZZ, or the like. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions.

Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, detailed embodiments of the disclosure is described with reference to the accompanying drawings.

FIG. 1 is a perspective view illustrating a system for measuring a depth of a stereoscopic image according to an exemplary embodiment.

Hereinafter, a first direction X, a second direction Y, and a third direction Z are different directions, and cross each other. In an exemplary embodiment, the first direction X, the second direction Y, and the third direction Z may vertically cross each other, the first direction X may be a transverse direction, the second direction Y may be a longitudinal direction, and the third direction Z may be a thickness direction. The first direction X, the second direction Y, and/or the third direction Z may include two or more directions. For example, the third direction Z may include an upward direction toward the upper side of the drawing and a downward direction toward the lower side of the drawing. In this case, one surface of a member facing the upward direction may be referred to as an upper surface, and the other surface of the member facing the downward direction may be referred to as a lower surface. However, these directions are illustrative and relative directions, and are not limited to those described above.

The system for measuring a depth of a stereoscopic image according to an exemplary embodiment of the present disclosure includes a display device and a holographic camera.

A display device 20 may be a stereoscopic image display device. The display device may separately display a left-eye image and a right-eye image in a space of a front surface of the display device 20 so that a user feels a three-dimensional effect due to binocular parallax. For example, the stereoscopic image display device may output an object 10 so that the user may recognize a stereoscopic image by disposing a member such as a barrier or a lenticular lens above a display panel 11.

Specifically, the display device 20 may provide image information by dividing an image displayed on the display panel 11 in the space of the front surface of the display device using a lens. By appropriately utilizing such an image information transfer method, the display device 20 may be utilized as the stereoscopic image display device that provides a three-dimensional (3D) image. Accordingly, the object 10 corresponding to a specific direction may be provided to a viewer. Here, the object 10 may be a target recognized as stereoscopic image information by the viewer. For example, the display device 20 may be a light field display device 20 that provides different image information for each position, but is not limited thereto.

Referring to FIG. 1, the display device 20 may include the display panel 11, a display driver 120, a base member 21, and three-dimensional lenses 22.

The display panel 11 may be a light emitting display panel 11 including light emitting elements. For example, the display panel 11 may include an organic light emitting display panel 11 using an organic light emitting diode including an organic light emitting layer, a micro light emitting diode display panel 11 using a micro light emitting diode (LED), a quantum dot light emitting display panel 11 using a quantum dot light emitting diode including a quantum dot light emitting layer, or an inorganic light emitting display panel 11 using an inorganic light emitting diode including an inorganic semiconductor, but is not limited thereto.

The display panel 11 may have a rectangular shape in a plan view. The display panel 11 may have long sides in the first direction X and short sides in the second direction Y. A corner where the long side in the first direction X and the short side in the second direction Y meet may be rounded with a predetermined curvature or right-angled. The shape of the display panel 11 in a plan view is not limited to the rectangular shape and may be a shape similar to other polygonal shapes, a circular shape, or an elliptical shape.

The display panel 11 may include a display area DA and a non-display area NDA disposed around the display area DA.

The display area DA may be an area in which an image is displayed, and the non-display areas NDA may be areas in which an image is not displayed. The display area DA may be an area in which a plurality of pixels PX (see FIG. 2) are disposed, and the non-display area NDA may be an area in which the plurality of pixels PX (see FIG. 2) are not disposed.

The non-display area NDA may be disposed around the display area DA to surround at least a portion of the display area DA. For example, the display area DA may have a substantially rectangular shape in a plan view, and the non-display area NDA may be disposed in a band shape surrounding four edges of the display area DA. However, embodiments of the present disclosure are not limited thereto, and the non-display area NDA may also be disposed to surround only a portion of the display area DA.

The display driver 120 may output signals and voltages for driving the display panel 11. The display driver 120 may supply data voltages to data lines. The display driver 120 may supply a source voltage to a power supply line and supply scan control signals to a scan driver. As an example, the display driver 120 may be formed as an integrated circuit (IC) and be disposed in the non-display area NDA of the display panel 11 in a chip on glass (COG) manner, a chip on plastic (COP) manner, or an ultrasonic bonding manner. As another example, the display driver 120 may be mounted on a circuit board and be connected to pads of the display panel 11.

The base member 21 may be disposed on an upper surface of the display panel 11. The upper surface of the display panel 11 may be a surface positioned in a direction in which an image is displayed, and a lower surface of the display panel 11 may be a surface opposite to the upper surface. The upper and lower surfaces of the display panel 11 may refer to front and rear surfaces of the display panel 11, respectively.

The base member 21 may be disposed on the upper surface of the display panel 11. For example, the base member 21 may be configured as a film-type member having a small thickness. The base member 21 may be disposed on the display area DA and the non-display area NDA of the display panel 11. However, embodiments of the present disclosure are not limited thereto, and the base member 21 may be disposed only on the display area DA.

The three-dimensional lenses 22 may be disposed on an upper surface of the base member 21. The three-dimensional lenses 22 may cover at least a portion of the upper surface of the base member 21. The three-dimensional lenses 22 may be disposed on the display area DA and the non-display area NDA. However, embodiments of the present disclosure are not limited thereto, and the three-dimensional lenses 22 may be disposed only on the display area DA.

The three-dimensional lenses 22 may be arranged at regular intervals to constitute a lens array. The three-dimensional lenses 22 may be slanted lenses extending in a direction slanted with respect to the first direction X and the second direction Y in a plan view, but is not limited thereto. The three-dimensional lenses 22 may extend parallel to the first direction X or the second direction Y.

Each of the three-dimensional lenses 22 may be a lenticular lens having a substantially semi-cylindrical shape or a lenticular lens array film. The three-dimensional lenses 22 may include a Fresnel lens.

The display device 20 may further include a coupling member. The coupling member may be interposed between the display panel 11 and the base member 21 to couple the display panel 11 and the base member 21 to each other. The coupling member may be optically transparent. For example, the coupling member may include an optically transparent adhesive or an optically transparent resin.

A holographic camera 30 may capture a three-dimensional stereoscopic image reproduced at a predetermined depth in a three-dimensional space. For example, the holographic camera 30 may obtain an image of the object 10 output from the display device 20. The holographic camera 30 may set a focus VF at a specific distance (or a specific depth) in the three-dimensional space and may define a range within a predetermined distance from the focus VF at which the focus VF is formed as a depth of field. The holographic camera may generate an interference fringe in a self-interference manner of incident light propagated from the object 10 and may calculate a depth of field of the object 10. According to some embodiments, an interference fringe may be a pattern of light and dark fringes that is produced when two or more light waves interfere with each other. For example, when a coherent light source, such as a laser, is split into two beams and then recombined, an interference pattern is created where the two beams meet. In some cases, the interference pattern may be created by the superposition of the light waves, where constructive interference produces bright fringes and destructive interference produces dark fringes. According to some embodiments, the interference fringe pattern may be captured by an image sensor 200 and used to reconstruct the 3D holographic image by the holographic camera 30.

According to some embodiments, the holographic camera 30 may evaluate a degree of sharpness of the image of the object 10 and calculate the degree of sharpness as the depth of field of the object 10. In some cases, the holographic camera 30 may calculate an edge of the image as an index for evaluating the degree of sharpness of the depth of field of the object 10. Hereinafter, a method in which the holographic camera 30 calculates the depth of field of the object 10 by calculating the edge in the image of the object 10 will be described. The holographic camera 30 includes a geometric phase lens 100, an image sensor 200, a space division phase shifting component 700, a fixed polarizer 600, an incident lens 300, and a control unit 40. The geometric phase lens 100 enables incident light to pass through and converts the incident light into each of left circularly polarized light and right circularly polarized light. The fixed polarizer 600 may convert the incident light into linearly polarized light before the incident light meets the geometric phase lens 100. The incident lens 300 performs an objective lens function of a general camera, a microscope, or the like. The image sensor 200 receives the left circularly polarized light and the right circularly polarized light each converted through the geometric phase lens 100. The space division phase shifting component 700 may convert the left circularly polarized light and the right circularly polarized light that have been converted through the geometric phase lens 100 into two linearly polarized lights. According to some embodiments, a holographic camera may generate an interference pattern image by sensing a wavelength and a phase of light of the stereoscopic image. Respective components of the holographic camera 30 will be described later with reference to FIG. 4.

The control unit 40 receives an interference pattern image P1 from the image sensor 200. The control unit 40 may calculate modulated image data based on the interference pattern image P1. The control unit 40 may calculate a plurality of modulated image data TID including phase and wavelength information of the object 10 according to a depth. In addition, the control unit 40 may divide each modulated image data TID into multiple image areas and compare the gray level values of each area with a threshold value to determine edges. In some cases, the threshold value is pre-stored. Here, these edges may be a metric for the sharpness of each depth field in the modulated image data TID. Accordingly, the control unit 40 may calculate the edges in each of the plurality of image areas in order to determine the degree of sharpness of the object 10, and calculate the depth of field based on calculating the edges. In some examples, the control unit 40 calculates the edges of the field by calculating the gray level values that meet a threshold in each of the modulated image data. A gray level value refers to the level of brightness of a pixel in an image. The control unit 40 may generate modulated signals by arranging respective edge detection values according to a depth. In some examples, the control unit 40 arranges respective edge detection values by ordering the edge detection values based on the depth of the modulated image data where they were detected. The control unit 40 may calculate the depth of field of the object 10. In addition, the control unit 40 includes a modulated image data calculator 41, an edge calculator 42, a modulated signal generator 43, and a depth of field calculator 44. This will be described later with reference to FIG. 5.

Figure 2:
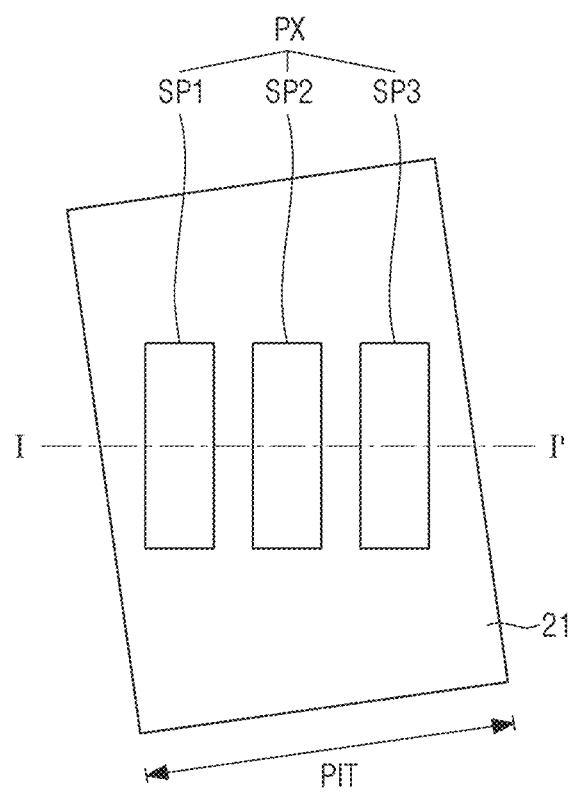
FIG. 2 is a detailed plan view of a display panel of a display device according to an exemplary embodiment.
Figure 3:
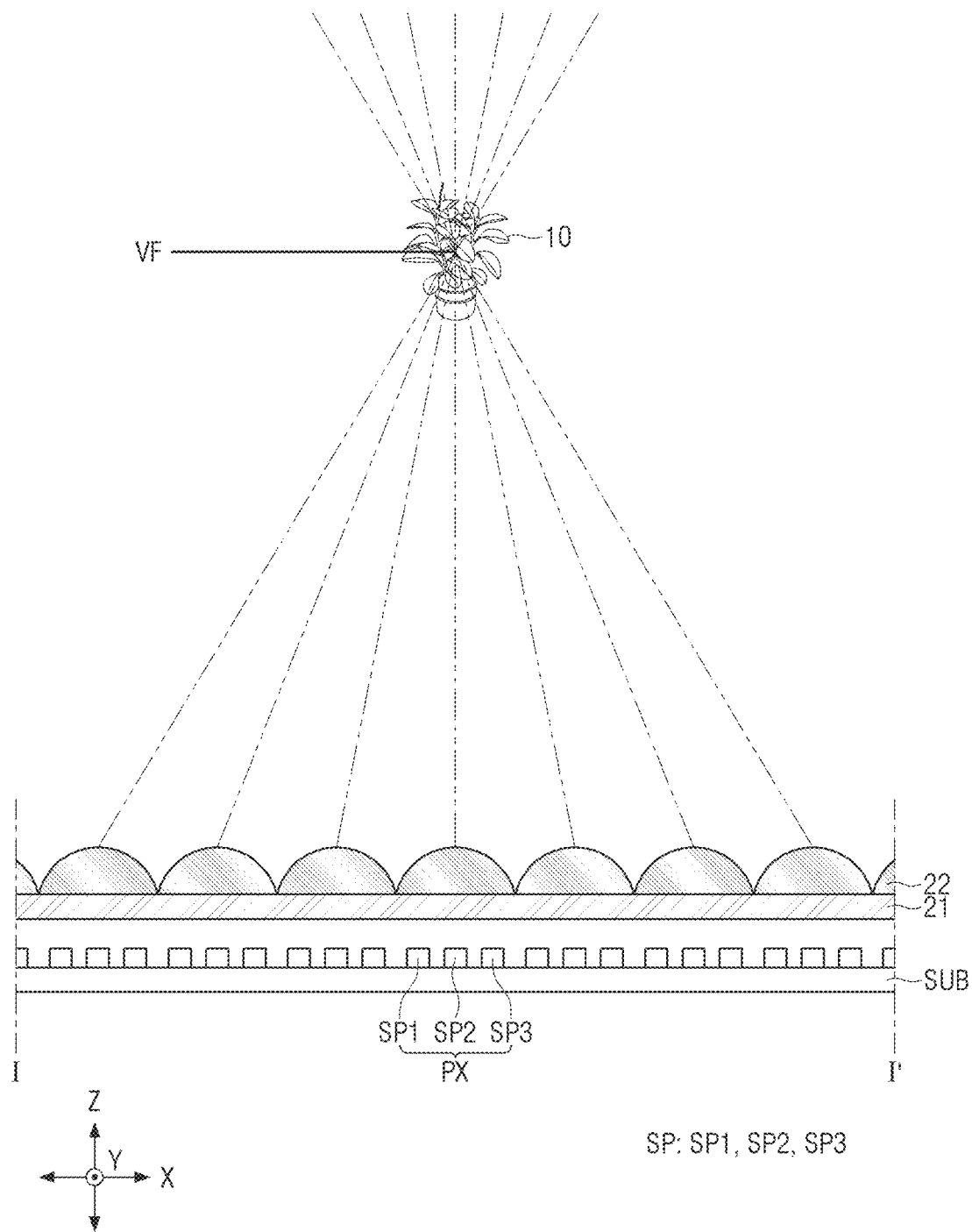
FIG. 3 is a cross-sectional view illustrating the display panel of the display device according to an exemplary embodiment.

FIG. 2 is a detailed plan view of a display panel 11 of a display device 20 according to an exemplary embodiment. FIG. 3 is a cross-sectional view illustrating the display panel 11 of the display device 20 according to an exemplary embodiment.

FIG. 2 conceptually illustrates an arrangement of the three-dimensional lenses 22 and the plurality of pixels PX, and FIG. 3 conceptually illustrates a method for implementing a stereoscopic image of the display device 20. For convenience of explanation, only three pixels PX and one lens of the display panel 11 are illustrated in FIG. 2, but the numbers of pixels PX and lenses are not limited thereto.

Referring to FIGS. 2 and 3, the display panel 11 may further include a substrate SUB. The substrate SUB may include an organic polymer material such as polyethylene, polyimide, polycarbonate, polysulfone, polyacrylate, polystyrene, polyvinylchloride, polyvinylalcohol, polynorbornene, or polyester. The display panel 11 may further include another substrate disposed between the base member 21 and the plurality of pixels PX.

The plurality of pixels PX may be disposed on an upper surface of the substrate SUB. Each of the plurality of pixels PX may include a plurality of sub-pixels SP.

The pixel PX may comprise a group of sub-pixels SP that collectively express a white gradation. Each sub-pixel SP is capable of expressing a gradation and is individually defined as a unit of the pixel PX.

As illustrated in FIGS. 2 and 3, in a plan view, three sub-pixels SP may be disposed to overlap one lens in the thickness direction, but embodiments of the present disclosure are not limited thereto. The number of sub-pixels SP overlapping one lens may be variously changed depending on a design of the display device 20. In addition, as illustrated in FIG. 3, the plurality of sub-pixels SP do not overlap boundaries of the three-dimensional lenses 22 in a plan view. In an embodiment, sub-pixels SP adjacent to the boundaries of the three-dimensional lenses 22 may also overlap the boundaries of the three-dimensional lenses 22 in a plan view.

The plurality of sub-pixels SP may include first sub-pixels SP1, second sub-pixels SP2, and third sub-pixels SP3.

The first sub-pixels SP1 may emit light of a first color, the second sub-pixels SP2 may emit light of a second color, and the third sub-pixels SP3 may emit light of a third color. The first color may be red, the second color may be green, and the third color may be blue, but the present disclosure is not limited thereto.

For example, each of the first sub-pixels SP1, the second sub-pixels SP2, and the third sub-pixels SP3 may have a rectangular shape, in a plan view, short sides in the first direction X and long sides in the second direction Y. However, the present disclosure is not limited thereto, and each of the first sub-pixels SP1, the second sub-pixels SP2, and the third sub-pixels SP3 may have various shapes such as a square shape, a rhombic shape, a circular shape, and an elliptical shape in a plan view.

The first sub-pixels SP1, the second sub-pixels SP2, and the third sub-pixels SP3 may be arranged in the first direction X in a plan view. The sub-pixels SP1, SP2, and SP3 may be arranged in a repeating sequence. For example, in an embodiment, the first sub-pixels SP1, the second sub-pixels SP2, and the third sub-pixels SP3 may be repeatedly arranged in the order of the first sub-pixels SP1, the second sub-pixels SP2 and the third sub-pixels SP3, but the present disclosure is not limited thereto.

As illustrated in FIG. 3, the first sub-pixels SP1, the second sub-pixels SP2, and the third sub-pixels SP3 may be arranged in an inclined direction relative to the direction of the extension of the three-dimensional lenses 22 and/or the boundaries of the three-dimensional lenses 22. However, the present disclosure is not limited thereto, and the first sub-pixels SP1, the second sub-pixels SP2, and the third sub-pixels SP3 may also be arranged in a direction orthogonal or parallel to a direction in which the three-dimensional lenses 22 extend and/or the boundaries of the three-dimensional lenses 22.

Referring to FIG. 3, the plurality of pixels PX may provide an object 10 image. The object 10 may be an image generated in consideration of binocular parallax.

The object 10 displayed by the plurality of pixels PX may be displayed in separate spaces on a front surface of the display device 20. The object 10 may be refracted by lenses and provided to a focus VF of the display device 20. The object 10 may be viewpoints provided to the focus VF by the display device 20. Accordingly, an image is formed on the focus VF of the object 10, and thus, the user may feel a three-dimensional effect of the object image. According to some embodiment, the object 10 may be reproduced at a predetermined focus VF.

Figure 4:
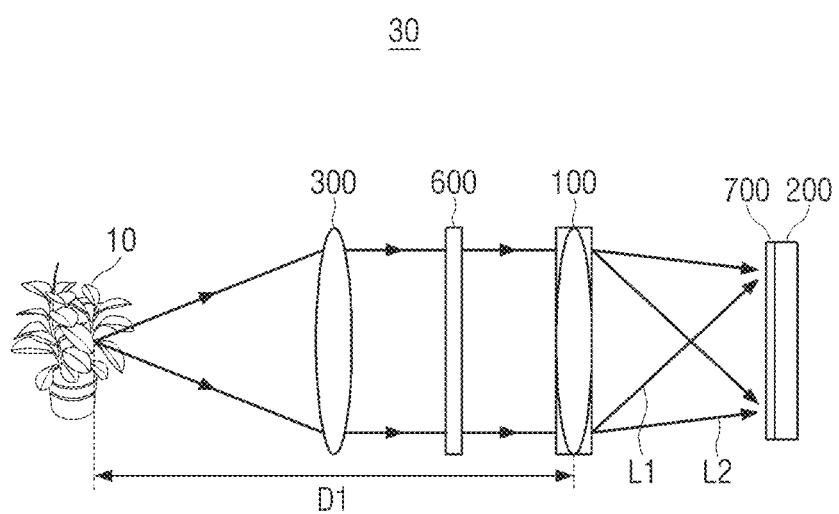
FIG. 4 is a cross-sectional view illustrating a holographic camera according to an exemplary embodiment.

FIG. 4 is a cross-sectional view illustrating a holographic camera 30 according to an exemplary embodiment.

Referring to FIG. 4, the holographic camera 30 includes a geometric phase lens 100, an image sensor 200, a space division phase shifting component 700, a fixed polarizer 600, an incident lens 300, and a control unit 40.

The geometric phase lens 100 is positioned to enable the incident light to pass through. The geometric phase lens 100 converts incident light of the object 10 into left circularly polarized light and right circularly polarized light. The incident light of the object may be converted into the left circularly polarized light and the right circularly polarized light in a process in which it passes through the geometric phase lens 100, and an interference fringe may be generated by interference between the converted left circularly polarized light and right circularly polarized light.

The geometric phase lens 100 is an element serving as a lens by a liquid crystal maintaining a specific fixed arrangement. In the geometric phase lens 100, a phase change occurs due to a change in polarization state of light according to birefringence characteristics of the liquid crystal, and accordingly, a wavefront of the incident light is modulated. The geometric phase lens 100 records a twin-image of a lens surface to be recorded, and accordingly, exhibits lens characteristics having both negative and positive focal lengths. In addition, since the geometric phase lens 100 has polarization selectivity, when the incident light is the right circularly polarized light, the right circularly polarized light converges according to the positive focal length while being converted into the left circularly polarized light, and when the incident light is the left circularly polarized light, the left circularly polarized light diverges according to the negative focal length while being converted into the right circularly polarized light. When linearly polarized or unpolarized light is incident, the linearly polarized or unpolarized light converges and diverges while energy is split in half. In some cases, the converging light becomes the left circularly polarized light, and the diverging light becomes the right circularly polarized light.

In addition, since the geometric phase lens 100 has the polarization selectivity, when the incident light is the right circularly polarized light, the right circularly polarized light converges according to the positive focal length while being converted into the left circularly polarized light Accordingly, when left circularly polarized light is incident, it diverges according to the negative focal length and is converted into right circularly polarized light. In contrast, when linearly polarized or unpolarized light is incident, the light converges and diverges while the energy is split in half. In some cases, the converging light becomes the left circularly polarized light, and the diverging light becomes the right circularly polarized light.

In some cases, circular polarization means that a vibration direction of an electric displacement vector (or magnetic field displacement vector) of a light wave is circular vibration. When the linearly polarized light is incident with a vibration surface inclined by 45° with respect to a main axis of a quarter-wave plate, light passing through the quarter-wave plate may be circularly polarized light. Circularly polarized light in which a vector of light of the object 10 rotates in a clockwise direction with respect to one axis is called right circularly polarized light, and circularly polarized light in which a vector of light of the object rotates in a counterclockwise direction with respect to one axis is called left circularly polarized light. This will be described later with reference to FIGS. 7 to 11.

According to some embodiments, the display device 20 displays an image of the object 10 to a user as a three-dimensional image at a depth within the display's virtual space. In some cases, the depth is predetermined. For example, the display device 20 displays the image of the object 10 in such a way that a visual effect is generated for the user viewing the displayed image such that the image of the object 10 appears to be formed at a point spaced apart from the user by a distance. In some cases, the distance is predetermined. Accordingly, the user may visually perceive the object 10 as at a depth corresponding to the depth of field.

According to some embodiments, the holographic camera 30 captures an image of the object 10, where the image of the object 10 appears to a viewer to be formed at a point spaced apart from the geometric phase lens 100 by a focal depth D1. For example, the focal depth D1 may be a distance from the geometric phase lens 100 to the object 10. Accordingly, the focal depth D1 at which the object 10 that is a stereoscopic image is reproduced may be calculated as the depth of field.

The image sensor 200 receives the left circularly polarized light and the right circularly polarized light, each of the left circularly polarized light and the right circularly polarized light is converted through the geometric phase lens 100. For example, incident light propagated from the object 10 may pass through the geometric phase lens 100 and form the left circularly polarized light and the right circularly polarized light. In some cases, the left circularly polarized light and the right circularly polarized light may interfere with each other and generate an interference fringe. The image sensor 200 may obtain information on the incident light through information on an obtained interference fringe. For example, an interference pattern image P1 (see FIG. 11) may be obtained through the interference fringe obtained by the image sensor 200.

The space division phase shifting means 700 is disposed in front of the image sensor 200. The space division phase shifting component 700 may convert the left circularly polarized light and the right circularly polarized light into two linearly polarized lights in a process in which the left circularly polarized light and the right circularly polarized light that have been converted through the geometric phase lens 100 are received by the image sensor 200, and the two linearly polarized lights, such that the two linearly polarized lights may be received by the image sensor 200.

The space division phase shifting component 700 is formed so that linearly polarized light having a different phase is received in each of a plurality of divided areas obtained by dividing a light receiving area of the image sensor 200. This will be described later with reference to FIG. 10.

The fixed polarizer 600 may be disposed in front of the geometric phase lens 100 so that incident light meets the fixed polarizer 600 before meeting the geometric phase lens 100. The fixed polarizer 600 may be disposed so that incident light passes therethrough before being incident on the geometric phase lens 100. The fixed polarizer 600 may convert the incident light into the linearly polarized light before the incident light meets the geometric phase lens 100. The fixed polarizer 600 may further enhance the interference between the left circularly polarized light and the right circularly polarized light and the interference of the linearly polarized light through the space division phase shifting component 700 by converting the incident light into the linearly polarized, and accordingly, a clearer interference fringe may be generated in the image sensor 200.

The incident lens 300 may be provided in front of the fixed polarizer 600. The incident lens 300 may condense the incident light. The incident lens 300 may be disposed so that the incident light propagated from the object 10 passes through the fixed polarizer 600 and is then incident on the geometric phase lens 100.

The incident lens 300 may be coaxially disposed in front of the fixed polarizer 600. Accordingly, the incident light propagated from the object 10 passes through the fixed polarizer 600 and is then incident on the geometric phase lens 100, and the incident lens 300 is to allow some of the incident light emitted in all directions from the object 10 to be incident on a holographic system according to the present disclosure, as described above, and performs an objective lens function of a general camera, a microscope, or the like.

Figure 5:
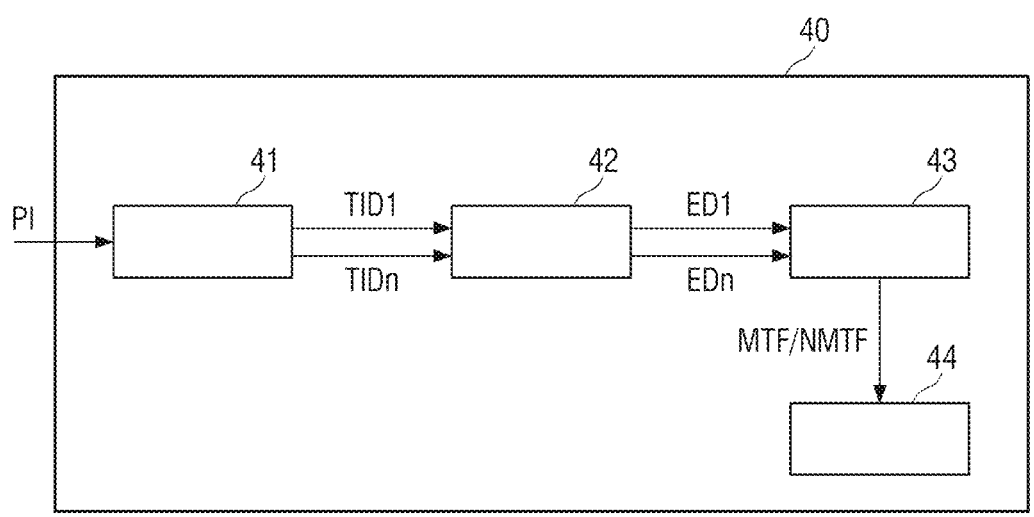
FIG. 5 is a block diagram illustrating a control unit of the holographic camera according to an exemplary embodiment.

FIG. 5 is a block diagram illustrating a control unit 40 of the holographic camera according to an exemplary embodiment.

The control unit 40 includes a modulated image data calculator 41, an edge calculator 42, a modulated signal generator 43, and a depth of field calculator 44.

The modulated image data calculator 41 receives the interference pattern image P1 (see FIG. 11) from the image sensor 200. The modulated image data calculator 41 may calculate modulated image data based on the interference pattern image P1 (see FIG. 11). Specifically, the modulated image data calculator 41 may calculate first to N-th modulated image data TID1 to TIDn including phase and wavelength information of the object 10 according to a depth. The modulated image data calculator 41 may output the first to N-th modulated image data TID1 to TIDn to the edge calculator 42.

The edge calculator 42 may receive the first to N-th modulated image data TID1 to TIDn from the modulated image data calculator 41. The edge calculator 42 may calculate a plurality of image areas in the respective modulated image data, and calculate gray level values of the respective image areas. In addition, the edge calculator 42 may calculate edges by comparing the respective gray level values with a pre-stored threshold value. The edge calculator 42 may calculate first to N-th edge detection values ED1 to EDn in the first to N-th modulated image data TID1 to TIDn, respectively. The edge calculator 42 may output the first to N-th edge detection values ED1 to EDn to the modulated signal generator 43.

The modulated signal generator 43 may receive the first to N-th edge detection values ED1 to EDn from the edge calculator 42. The modulated signal generator 43 may generate modulated signals by arranging the first to N-th edge detection values ED1 to EDn according to a depth. In addition, in another exemplary embodiment, the modulated signal generator 43 may generate normal modulated signals by normalizing the modulated signals. Accordingly, the depth of field calculator 44 may calculate the depth of field of the object 10.

Figure 6:
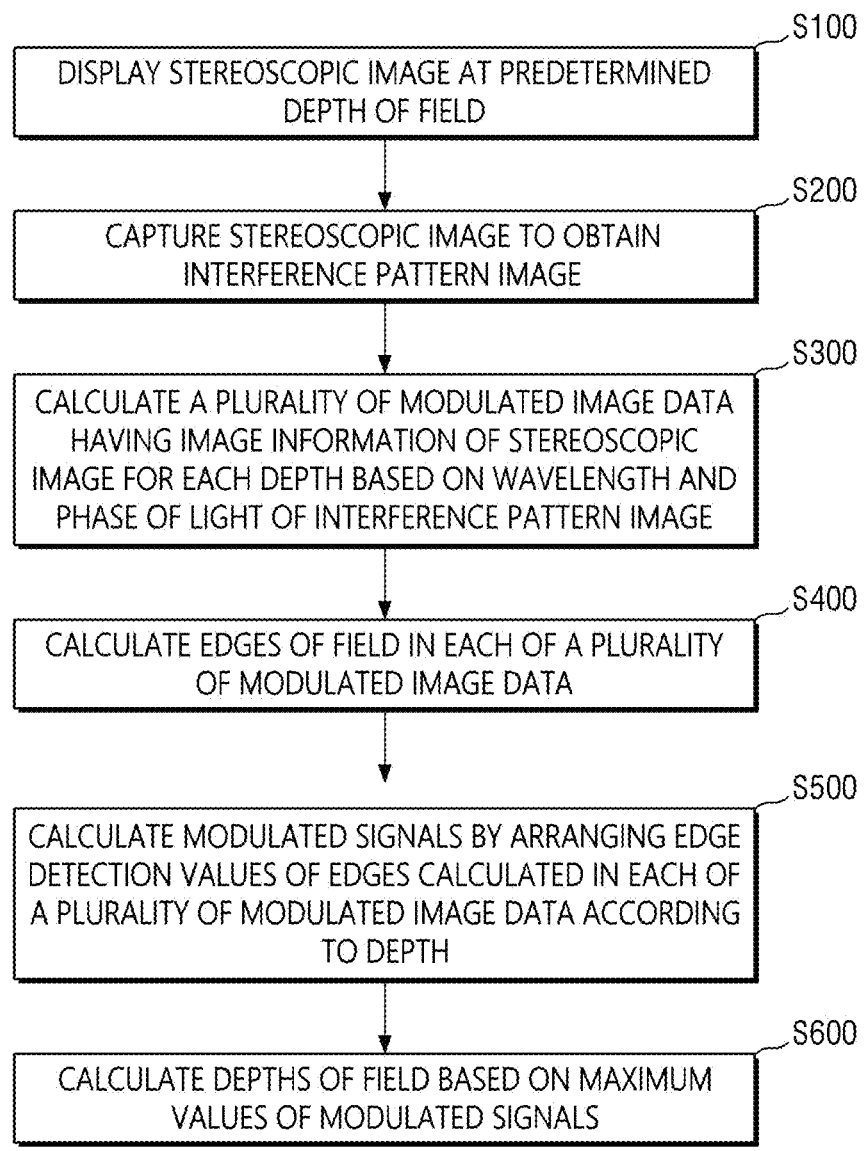
FIG. 6 is a flowchart illustrating a method for measuring a depth of a stereoscopic image according to an exemplary embodiment.
Figure 7:
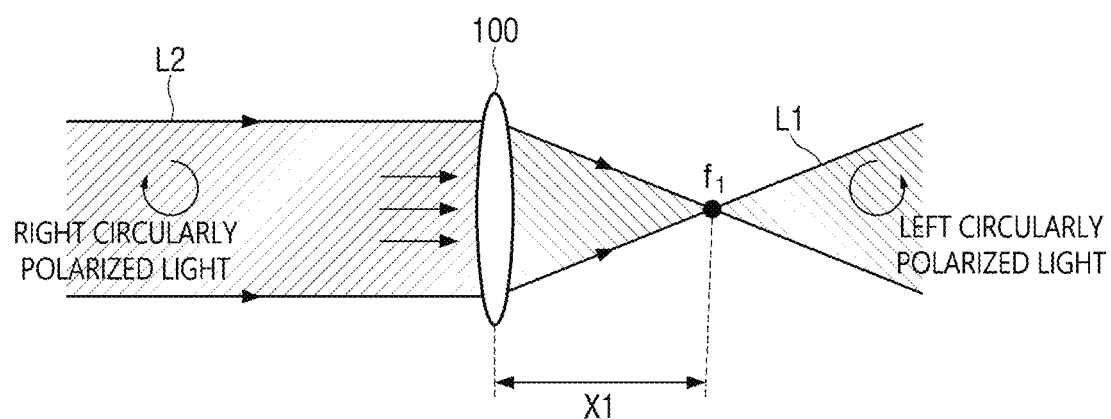
FIGS. 7 to 9 are cross-sectional views illustrating a method for obtaining a stereoscopic image according to an exemplary embodiment.
Figure 8:
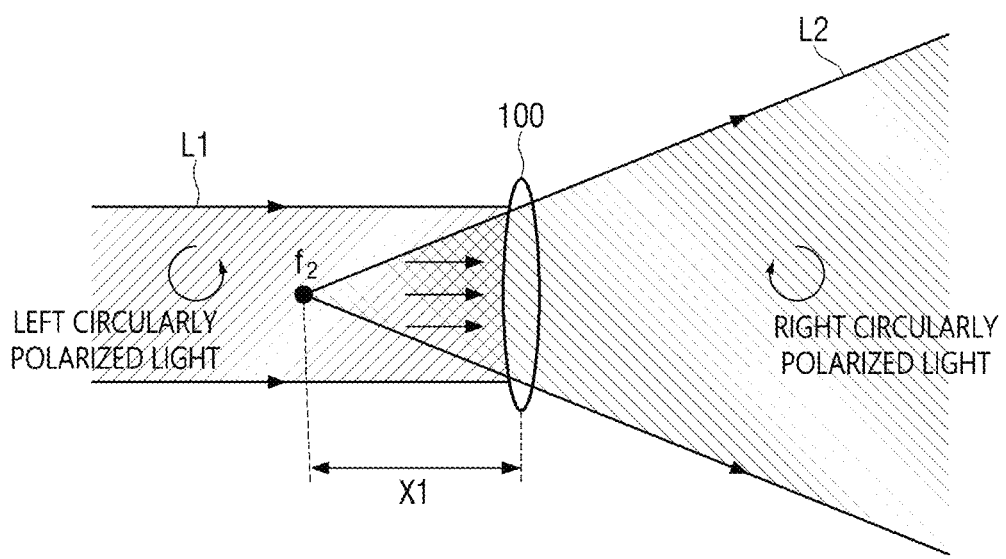
Figure 9:
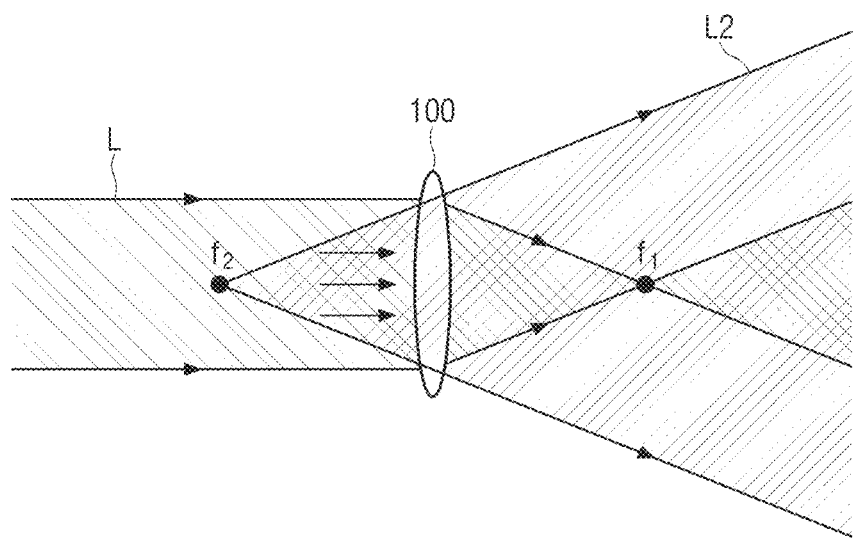
Figure 10:
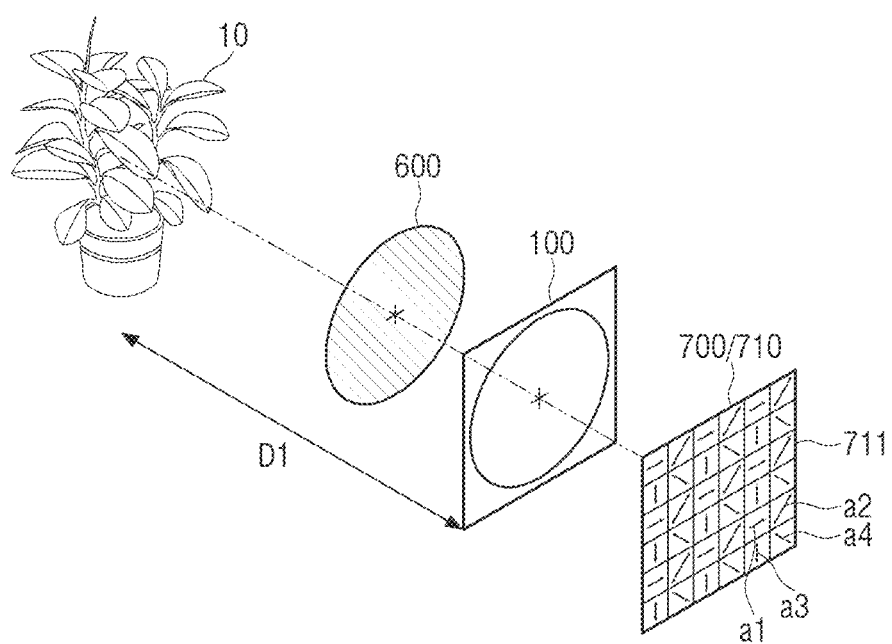
FIG. 10 is a perspective view illustrating the method for obtaining a stereoscopic image of the holographic camera according to an exemplary embodiment.
Figure 11:
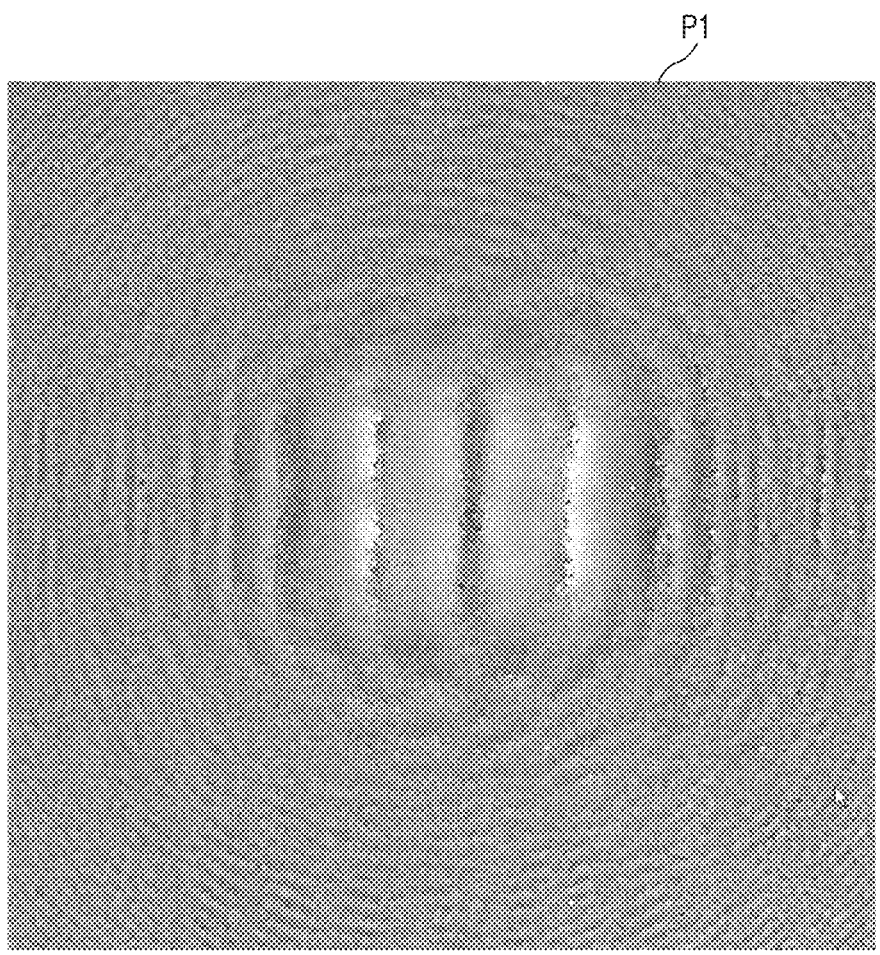
FIG. 11 is an interference pattern image obtained by the holographic camera according to an exemplary embodiment.
Figure 12:
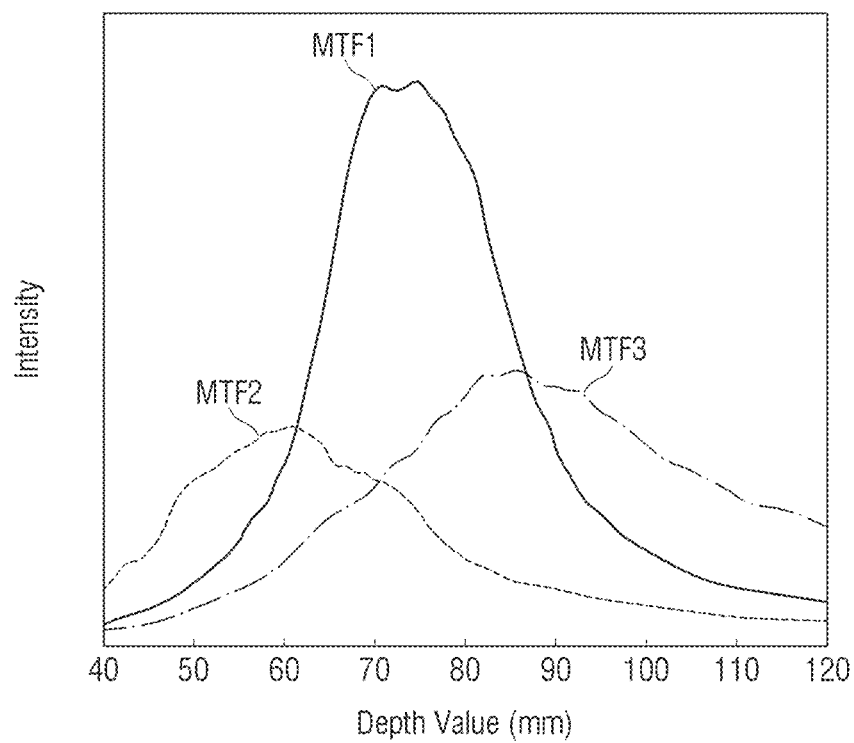
FIG. 12 is a graph illustrating modulated signals according to an exemplary embodiment.
Figure 13:
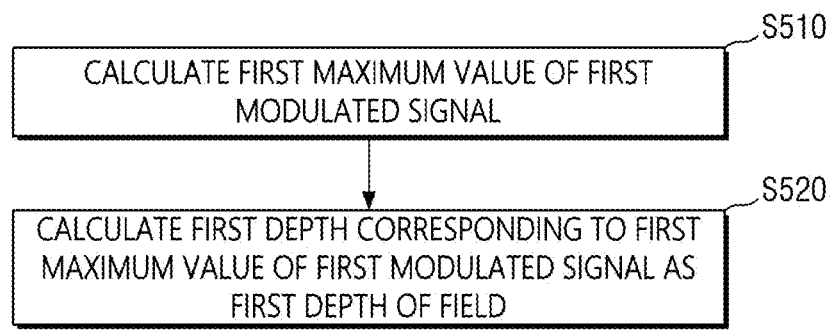
FIG. 13 is a flowchart illustrating a method for calculating a depth of field of the holographic camera according to an exemplary embodiment.
Figure 14:
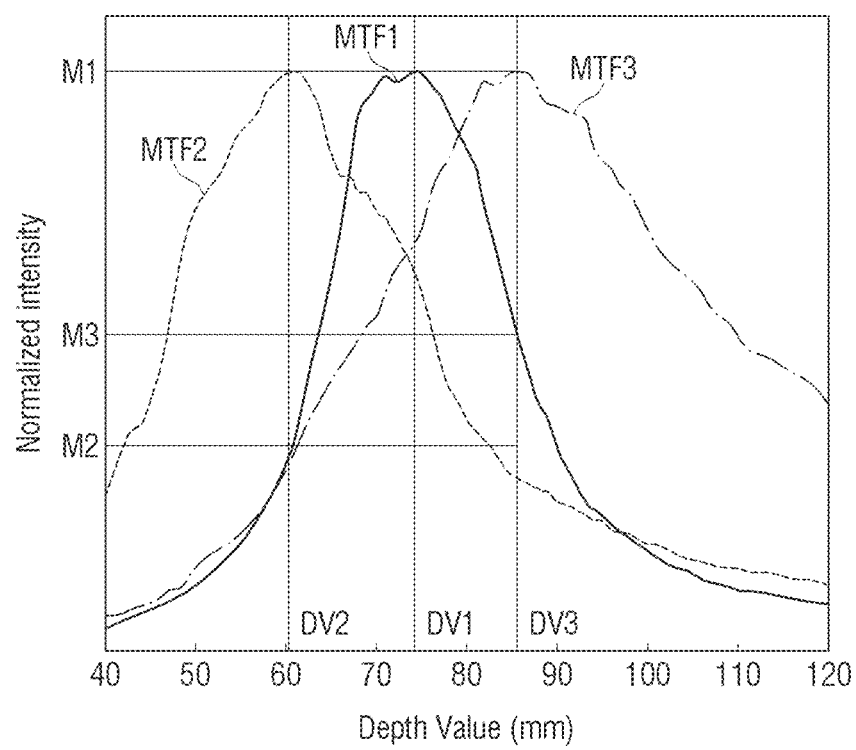
FIG. 14 is a graph illustrating modulated signals according to an exemplary embodiment.

FIG. 6 is a flowchart illustrating a method for measuring a depth of a stereoscopic image of the system for measuring a depth of a stereoscopic image according to an exemplary embodiment. FIGS. 7 to 9 are cross-sectional views illustrating a method for obtaining a stereoscopic image of the holographic camera 30 according to an exemplary embodiment. FIG. 10 is a perspective view illustrating the method for obtaining a stereoscopic image of the holographic camera 30 according to an exemplary embodiment. FIG. 11 is an interference pattern image P1 obtained by the holographic camera 30 according to an exemplary embodiment. FIG. 12 is a graph illustrating modulated signals according to an exemplary embodiment. FIG. 13 is a flowchart illustrating a method for calculating a depth of field of the holographic camera 30 according to an exemplary embodiment. FIG. 14 is a graph illustrating modulated signals according to an exemplary embodiment. A method for measuring a depth of a stereoscopic image of the system for measuring a depth of a stereoscopic image will be described with reference to FIGS. 6 to 14.

Referring to FIG. 6, first, the display device 20 displays the object 10 as a stereoscopic image at a predetermined depth of field (S100). The stereoscopic image displayed at a predetermined depth of field may have a plurality of depths in the three-dimensional space. According to some embodiments, the object 10 may be refracted by lenses and provided to a focus VF of the display device 20. The object 10 may be viewpoints provided to the focus VF by the display device 20. Accordingly, an image is formed on the focus VF of the object 10, and thus, the user may feel a three-dimensional effect of the object image. According to some embodiments, the object 10 may be reproduced at a predetermined focus VF.

Then, the holographic camera 30 captures the stereoscopic image to obtain the interference pattern image P1 (S200).

The holographic camera 30 captures an image of the object 10 displayed by the display device 20. According to some embodiments, the incident light of the object 10 is converted into the left circularly polarized light and the right circularly polarized light in a process in which it passes through the geometric phase lens 100, and the interference fringe may be generated by interference between the converted left circularly polarized light and right circularly polarized light. Such an interference fringe is generated on the image sensor 200 and obtained by the image sensor 200.

In some cases, when the holographic camera 30 captures the image of the object 10, the image of the object 10 may appear to a viewer to be formed at the point spaced apart from the geometric phase lens 100 by the focal depth D1. For example, the focal depth D1 may be the distance from the geometric phase lens 100 to the object 10. Accordingly, the focal depth D1 at which the object 10 that is a stereoscopic image is reproduced may be calculated as the depth of field.

Hereinafter, a method in which the holographic camera 30 obtains the interference pattern image P1 will be described in detail with reference to FIGS. 7 to 11.

First, as illustrated in FIG. 7, when right circularly polarized light L2 converted from the incident light of the object 10 is incident on the geometric phase lens 100, a first focus $f_1$ has a positive focal length X1. In addition, the right circularly polarized light L2 is converted into left circularly polarized light L1. Meanwhile, as illustrated in FIG. 8, when left circularly polarized light L1 converted from the incident light of the object 10 is incident on the geometric phase lens 100, a second focus $f_2$ has a negative focal length X1. In addition, the left circularly polarized light L1 is converted into right circularly polarized light L2. As illustrated in FIG. 9, when linearly polarized or unpolarized light L is incident on the geometric phase lens 100, energy is split in half, some of the linearly polarized or unpolarized light L has a first focal point $f_1$ having a positive value and is converted into and converges as left circularly polarized light L1, and some of the linearly polarized or unpolarized light L has a second focal point $f_2$ having a negative value and is converted into and diverges as right circularly polarized light L2.

Accordingly, the incident light that is emitted or reflected from the object 10 and is propagated passes through the geometric phase lens 100 to be converted into the left circularly polarized light and the right circularly polarized light, and an interference fringe is generated by the interference between the converted left circularly polarized light and right circularly polarized light. Such an interference fringe is generated on the image sensor 200 and obtained by the image sensor 200.

Meanwhile, the space division phase shifting component 700 converts the left circularly polarized light and the right circularly polarized light that have been converted through the geometric phase lens 100 into two linearly polarized lights, which are received by the image sensor 200. In some cases, the space division phase shifting component 700 is formed so that linearly polarized light having a different phase is received in each of a plurality of divided areas obtained by dividing the light receiving area of the image sensor 200.

Referring further to FIG. 10, the space division phase shifting component 700 includes a micro polarizer array 710 attached to a front surface of the image sensor 200.

The micro polarizer array 710 is arranged a plurality of fine polarizers 711 convert transmitted light into linearly polarized light, corresponding to the plurality of divided areas of the image sensor 200. For example, as the image sensor 200 has numerous pixels, the divided areas of the image sensor 200 can be formed in pixel units. In addition, the fine polarizers 711 may be arranged to correspond to the pixels of the image sensor 200, respectively.

The fine polarizer 711 may appear to be formed as a polarizer that converts the transmitted light into the linearly polarized light. In some cases, light transmission axes a1, a2, a3, and a4 of the fine polarizers 711 are formed to have different angles so that a phase of the linearly polarized light converted through the fine polarizers 711 is different for each fine polarizer 711. For example, each of the light transmission axes a1, a2, a3, and a4 of the fine polarizers 711 may be formed to have any one of four different types of light transmission axis angles that are sequentially changed with an angle difference of 45° as illustrated in FIG. 10. Accordingly, the linearly polarized lights converted through the respective fine polarizers 711 have a phase difference of 45° therebetween according to the angles of the light transmission axes a1, a2, a3, and a4.

According to some embodiments, the incident light propagated from the object 10 passes through the geometric phase lens 100 to be converted into the left circularly polarized light and the right circularly polarized light. The converted left circularly polarized light and right circularly polarized light are converted into the two linearly polarized lights while passing through the fine polarizers. The image sensor 200 receives the two linearly polarized light of the object 10. As illustrated in FIG. 11, an interference pattern is generated by interference between the two linearly polarized light, and the image sensor 200 obtains an interference pattern image P1.

The holographic camera 30 according to embodiments of the present disclosure may obtain information on the incident light through the information on the interference fringe obtained by the image sensor 200. For example, the image sensor 200 may obtain the interference pattern image P1.

Referring back to FIG. 6, the control unit 40 calculates the plurality of modulated image data TID having image information of the stereoscopic image for each depth based on a wavelength and a phase of the light of the interference pattern image P1 (S300). For example, the control unit 40 analyzes the wavelength and phase information of the light captured in the interference pattern image P1 obtained by the holographic camera and uses this information to calculate a plurality of modulated image data TID. Each of the plurality of modulated image data TID represents a different depth of the stereoscopic image and contains image information corresponding to that depth. Accordingly, a 3D representation of the object with different depths may be generated in the final display image based on the wavelength and phase information.

The control unit 40 may analyze the wavelength and phase information of the light of the object 10 based on the interference pattern image P1. Accordingly, the control unit may calculate the plurality of modulated image data TID.

For example, FIG. 11 illustrates an interference pattern image P1 of three objects OBJ having different depths of field. The control unit 40 may calculate the first to N-th modulated image data TID1 to TIDn by analyzing the wavelength and phase information of the light of the interference pattern image P1. The first to N-th modulated image data TID1 to TIDn include information on an image according to the distance from the geometric phase lens 100. For example, the first to N-th modulated image data TID1 to TIDn include information on the stereoscopic image according to a depth from the geometric phase lens 100, respectively.

Accordingly, each of the modulated image data may include image information on the object 10 at any one depth. For example, each modulated image data may include information on luminance of the object 10 at each depth. In addition, each of the modulated image data may include a plurality of image areas. The plurality of image areas may include gray level values, respectively. For example, each of the plurality of modulated image data TID may include image areas having the respective gray level values.

For example, a k-th modulated image data TIDk, which is any one of the first to N-th modulated image data TID1 to TIDn, may include information on the object 10 at any one depth between the object 10 and the geometric phase lens 100. In addition, the k-th modulated image data TIDk may include a plurality of image areas having the respective gray level values.

Next, the control unit 40 calculates edges of the field in each of the plurality of modulated image data TID (S400).

According to some embodiments, the control unit 40 calculates the gray level values of the image areas in each of the plurality of modulated image data. The control unit then determines whether the gray level values exceed a first threshold value. After that, the control unit 40 calculates the edges of the field for areas where the gray level values are greater than or equal to the first threshold value. For example, when the display device 20 displays images of the object at different depths of field, the first to N-th modulated image data TID1 to TIDn will contain information about each of the objects, corresponding to their gray level values. In such cases, the control unit 40 may calculate the edges of the first to third objects in each of the modulated image data TID1 to TIDn. This will be described later with reference to FIGS. 15 to 18.

Next, the control unit 40 calculates the modulated signals by arranging edge detection values of the edges calculated in each of the plurality of modulated image data TID according to the depth (S500).

An exemplary embodiment of FIG. 12 illustrates modulated signals corresponding to three objects OBJ having different depths of field. According to some embodiments, the control unit 40 may calculate edges of the first to third objects in each of the first to N-th modulated image data TID1 to TIDn. Accordingly, the control unit 40 may calculate first to third modulated signals MTF1 to MTF3 corresponding to the first to third objects. Hereinafter, the first to third modulated signals MTF1 to MTF3 corresponding to the first to third objects will be described. However, the numbers of objects OBJ and modulated signals are not limited thereto.

The first to third modulated signals MTF1 to MTF3 will be described in detail with reference to FIG. 12. The control unit 40 calculates the edges in each of the first to N-th modulated image data TID1 to TIDn. In some cases, the control unit 40 may also calculate the edge detection values for each of the edges. The control unit 40 may arrange the edge detection values of each of the first to N-th modulated image data TID1 to TIDn according to a depth. The control unit 40 may generate the modulated signals by continuously calculating the edge detection values arranged according to the depth.

For example, when the display device 20 displays the first to third objects having different depths of field, the control unit 40 may calculate the edges of the first to third objects in each of the first to N-th modulated image data TID1 to TIDn. In some cases, the control unit 40 may also calculate the edge detection values for each of the edges. The control unit may arrange the edge detection values of each of the first to N-th modulated image data TID1 to TIDn according to the depth. The control unit 40 may generate the first to third modulated signals MTF1 to MTF3 by continuously calculating the edge detection values arranged according to the depth. However, the numbers of objects OBJ and modulated signals are not limited thereto, and the number of modulated signals may be specified according to the number of objects OBJ having different depths of field in the display device 20.

Finally, the control unit 40 calculates depths of field based on maximum values of the modulated signals (S600). Hereinafter, a method for calculating a depth of field of the object 10 will be described with further reference to FIGS. 13 and 14.

Referring to FIGS. 13 and 14, the control unit 40 calculates a first maximum value M1 of the first modulated signal MTF1 (S510). For example, the first modulated signal MTF1 may have a convex-up waveform. In some cases, the control unit 40 may calculate a peak value of the first modulated signal MTF1 as the first maximum value M1. Alternatively, the control unit 40 may calculate the greatest value of the first modulated signal MTF1 as the first maximum value M1. Accordingly, the first modulated signal MTF1 has a value smaller than the first maximum value M1 at a depth smaller than a first depth DV1 on the basis of the first depth DV1 corresponding to the first maximum value M1. In addition, the first modulated signal MTF1 has a value smaller than the first maximum value M1 at a depth greater than the first depth DV1. As another example, the control unit 40 may calculate a point at which a differential value of the first modulated signal MTF1 becomes 0 as the first maximum value M1 of the first modulated signal MTF1. In some cases, the point at which the differential value of the first modulated signal MTF1 becomes 0 may be the same as a point at which the first modulated signal MTF1 has a peak value. A method for calculating a second maximum value M2 and a second depth DV2 of the second modulated signal MTF2 and a third maximum value M3 and a third depth DV3 of the third modulated signal MTF3 is substantially the same as the method for calculating the first maximum value M1 of the first modulated signal MTF1, and a description thereof will thus be omitted.

The control unit 40 may calculate the first depth DV1 corresponding to the first maximum value M1 of the first modulated signal MTF1 as a first depth of field (S520). The first modulated signal MTF1 includes information according to intensity of light of the object 10. Accordingly, when the first modulated signal MTF1 has the first maximum value M1 at the first depth DV1, the control unit 40 may determine that the image of the object 10 is formed at a depth having the first maximum value M1. For example, the control unit 40 may calculate the first depth DV1 having the first maximum value M1 of the first modulated signal MTF1 as a depth of the object 10. In addition, a method for calculating a depth of field based on a maximum value of each of the second modulated signal MTF2 and the third modulated signal MTF3 is substantially the same as the method for calculating the depth of field of the first modulated signal MTF1, and a description thereof will thus be omitted.

According to some embodiments, the display device 20 may display a stereoscopic image including the object 10, and the holographic camera 30 may obtain stereoscopic image information of the object 10. The holographic camera 30 may analyze the stereoscopic image information of the object 10 to calculate a modulated signal, and analyze the modulated signal to calculate the depth of field of the object 10. For example, the holographic camera may calculate a distance at which an image of the object 10 of the stereoscopic image displayed by the display device 20 is formed. According to some embodiments, a holographic camera generates an interference pattern image by sensing a wavelength and a phase of light of the stereoscopic image.

Figure 15:
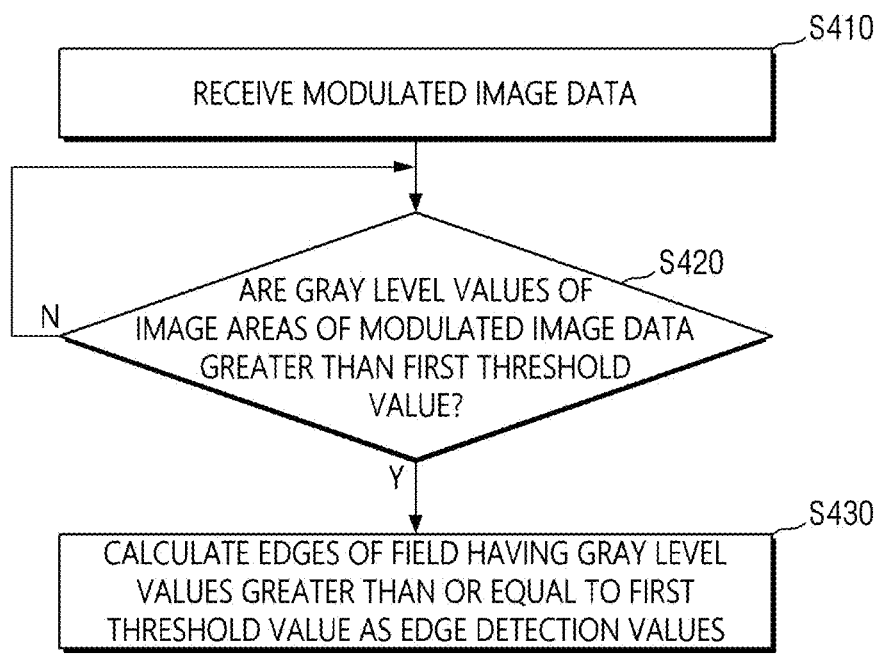
FIG. 15 is a flowchart illustrating a method for calculating an edge of the holographic camera according to an exemplary embodiment.
Figure 16:
FIG. 16 is a diagram illustrating image areas of first modulated image data.
Figure 17:
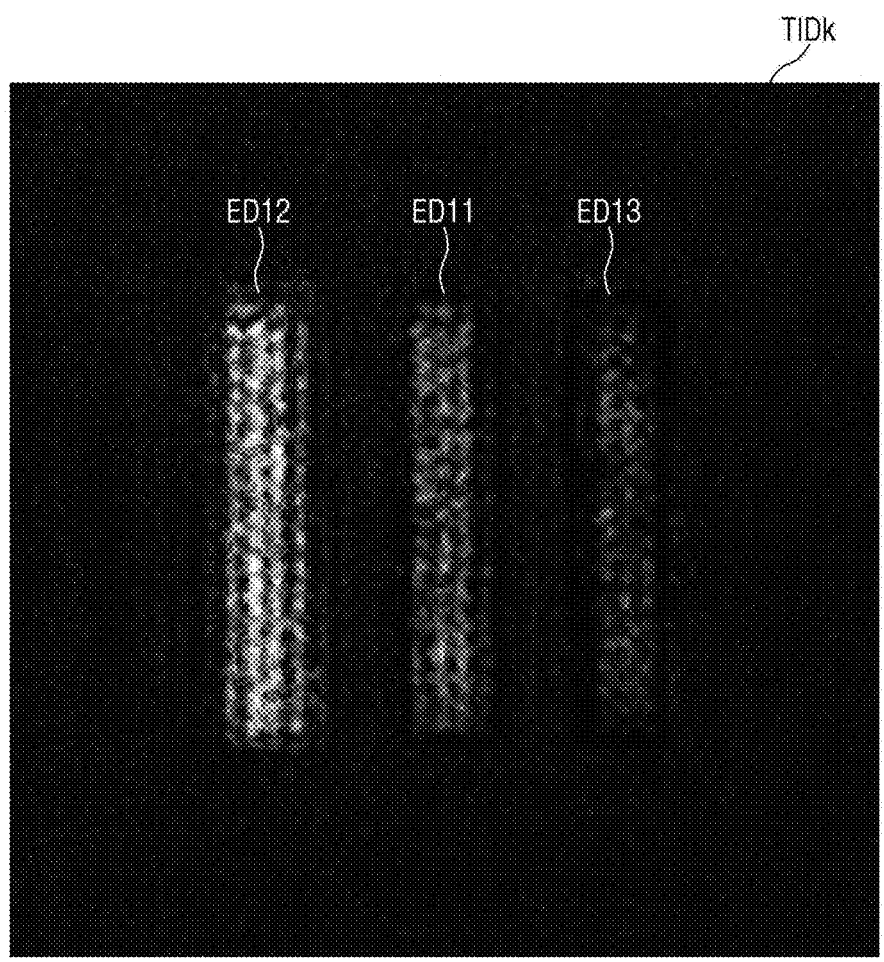
FIGS. 17 and 18 are diagrams illustrating edges of modulated image data.
Figure 18:
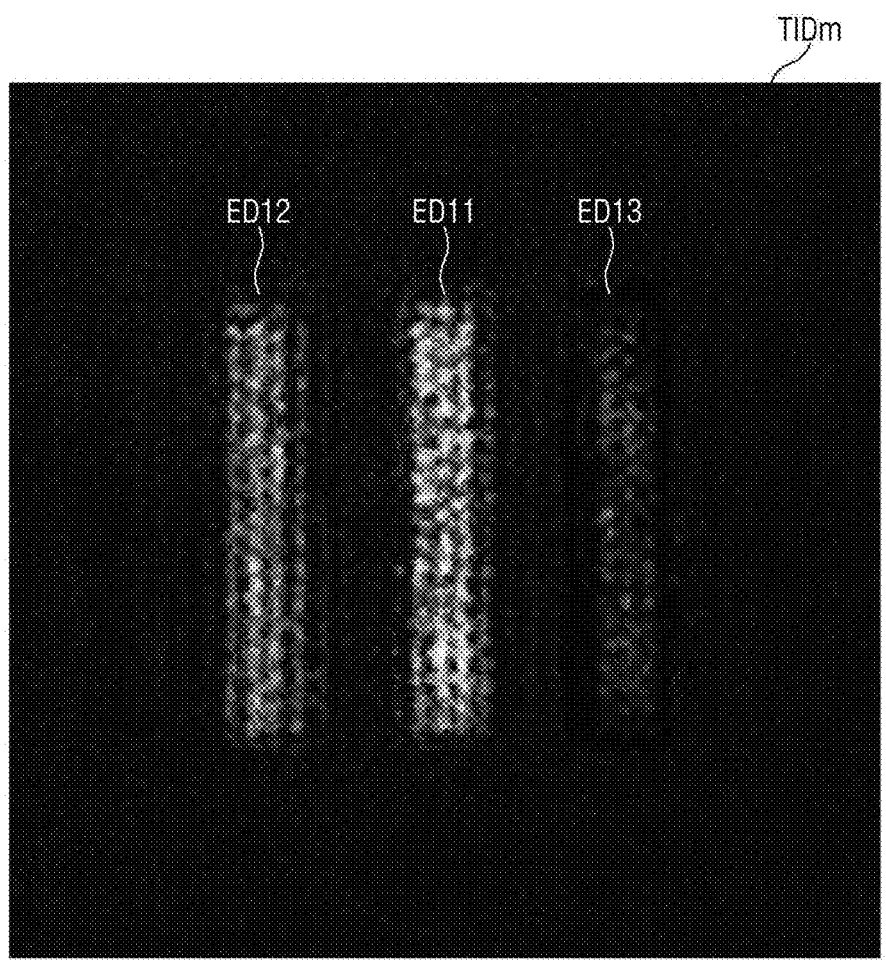

FIG. 15 is a flowchart illustrating a method for calculating an edge of the holographic camera 30 according to an exemplary embodiment. FIG. 16 is a diagram illustrating image areas of first modulated image data TID1. FIGS. 17 and 18 are diagrams illustrating edges of modulated image data. FIGS. 17 and 18 illustrate modulated data images obtained by the holographic camera 30 when the display device 20 displays objects OBJ having three different depths of field. Hereinafter, for convenience of explanation, a case where the display device 20 displays the first to third objects will be described.

Referring to FIG. 15, the control unit 40 may receive modulated image data (S410), and determine whether or not gray level values of image areas of the modulated image data are greater than a first threshold value (S420).

The control unit 40 may receive a plurality of modulated image data TID. Specifically, each of the modulated image data may include a plurality of image areas. The plurality of image areas may include gray level values, respectively. For example, each of the plurality of modulated image data TID may include image areas having the respective gray level values. Accordingly, the control unit 40 may determine whether or not a gray level value of at least one image area of the modulated image data is greater than the first threshold value.

FIG. 16 conceptually illustrates image areas of the first modulated image data TID1 of the first to N-th modulated image data TID1 to TIDn. For convenience of explanation, only 24 image areas of any one modulated image data corresponding to a first object have been illustrated in FIG. 16, but the number of image areas is not limited thereto.

Referring to FIG. 16, the first modulated image data TID1 of the first to N-th modulated image data TID1 to TIDn includes a plurality of image areas. For example, the first modulated image data TID1 of the first to N-th modulated image data TID1 to TIDn includes eleventh to fourteenth image areas IA11 to IA14, twenty-first to twenty-fourth image areas IA21 to IA24, thirty-first to thirty-fourth image areas IA31 to IA34, forty-first to forty-fourth image areas IA41 to IA44, fifty-first to fifty-fourth image areas IA51 to IA54, and sixty-first to sixty-fourth image areas IA61 to IA64.

The control unit 40 may determine whether or not gray level values of the respective image areas are greater than a first threshold value. For example, the plurality of image areas may include respective gray level values. For example, the twenty-second image area IA22, the thirty-second image area IA32, the thirty-third image area IA33, the forty-second image area IA42, and the fifty-second image area IA52 may have the same gray level value. In addition, the fourteenth image area IA14 and the twenty-fourth image area IA24 may have a gray level value smaller than the gray level value of the twenty-second image area IA22. In some cases, the control unit 40 may compare the gray level values of the respective image areas with the first threshold value. For example, the control unit 40 may determine that the gray level values of the fourteenth image area IA14 and the twenty-fourth image area IA24 are smaller than the first threshold value. In addition, the control unit 40 may determine that the gray level values of the twenty-second image area IA22, the thirty-second image area IA32, the thirty-third image area IA33, the forty-second image area IA42, and the fifty-second image area IA52 are greater than the first threshold value.

Accordingly, the control unit 40 may calculate edges of the field having the gray level values greater than or equal to the first threshold value as edge detection values (S430).

The control unit 40 may calculate image areas having the gray level values greater than the first threshold value as the edges of the field. For example, when the control unit determines that the gray level values of the twenty-second image area IA22, the thirty-second image area IA32, the thirty-third image area IA33, the forty-second image area IA42, and the fifty-second image area IA52 are greater than the first threshold value, the control unit 40 may calculate the twenty-second image area IA22, the thirty-second image area IA32, the thirty-third image area IA33, the forty-second image area IA42, and the fifty-second image area IA52 as the edges of the field. In some cases, the edges of the field may be adjacent to the image areas having the gray level values smaller than the first threshold value.

The control unit 40 may calculate edges in each of the first to N-th modulated image data TID1 to TIDn. Hereinafter, a method for calculating an edge in modulated image data will be described by way of example with reference to FIGS. 17 and 18. FIG. 17 conceptually illustrates edges of a k-th modulated image data TIDk of the first to N-th modulated image data TID1 to TIDn, and FIG. 18 conceptually illustrates edges of an m-th modulated image data TIDn of the first to N-th modulated image data TID1 to TIDn. Here, each of the k-th modulated image data TIDk and the m-th modulated image data TIDm may be any one of the first to N-th modulated image data TID1 to TIDn.

Referring to FIGS. 17 and 18, the control unit 40 may calculate edges in the k-th modulated image data TIDk. For example, the control unit 40 may calculate an 11-th edge ED11, a 12-th edge ED12, and a 13-th edge ED13 in the k-th modulated image data TIDk. The eleventh edge ED11, the twelfth edge ED12, and the thirteenth edge ED13 may have edge detection values having gray level values, respectively. For example, in a case of the k-th modulated image data TIDk of FIG. 17, an edge detection value of the eleventh edge ED11 may be greater than an edge detection value of the twelfth edge ED12. In addition, the edge detection value of the twelfth edge ED12 may be greater than an edge detection value of the thirteenth edge ED13.

In addition, the control unit 40 may calculate edges in the m-th modulated image data TIDm. For example, the control unit 40 may calculate an eleventh edge ED11, a 12-th edge ED12, and a thirteenth edge ED13 in the m-th modulated image data TIDm. The eleventh edge ED11, the twelfth edge ED12, and the thirteenth edge ED13 may have edge detection values having gray level values, respectively. For example, in a case of the m-th modulated image data TIDm of FIG. 18, an edge detection value of the 12-th edge ED12 may be greater than an edge detection value of the eleventh edge ED11. In addition, the edge detection value of the eleventh edge ED11 may be greater than an edge detection value of the thirteenth edge ED13.

Meanwhile, the edge detection values of the m-th modulated image data TIDm may be different from the edge detection values of the k-th modulated image data TIDk. For example, the edge detection value of the eleventh edge ED11 of the m-th modulated image data TIDm may be smaller than the edge detection value of the eleventh edge ED11 of the k-th modulated image data. In addition, the edge detection value of the 12-th edge ED12 of the m-th modulated image data TIDm may be greater than the edge detection value of the 12-th edge ED12 of the k-th modulated image data. In addition, the edge detection value of the thirteenth edge ED13 of the m-th modulated image data TIDm may be smaller than the edge detection value of the thirteenth edge ED13 of the k-th modulated image data. Here, the respective edges may correspond to the objects OBJ. For example, the first object displayed by the display device 20 may correspond to the eleventh edge ED11, the second object displayed by the display device 20 may correspond to the 12-th edge ED12, and the third object displayed by the display device 20 may correspond to the thirteenth edge ED13.

According to some embodiments, the control unit 40 may calculate the first edge corresponding to the first object, the second edge corresponding to the second object, and the third edge corresponding to the third object in each of the first to N-th modulated image data TID1 to TIDn. For example, the control unit 40 may calculate the edges corresponding to the respective objects OBJ. Accordingly, the control unit 40 may generate the modulated signal based on the edge detection values of each of the edges. Accordingly, the control unit may generate an accurate modulated signal by calculating the edges in each of the modulated image data.

Figure 19:
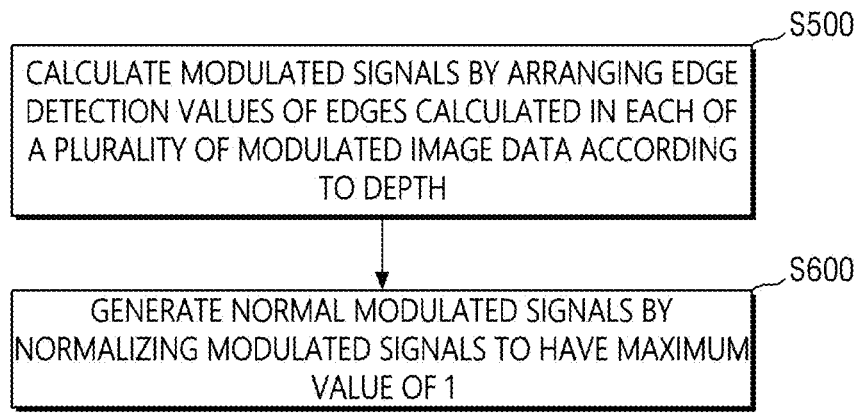
FIG. 19 is a flowchart illustrating a method for calculating a modulated signal according to another exemplary embodiment.
Figure 20:
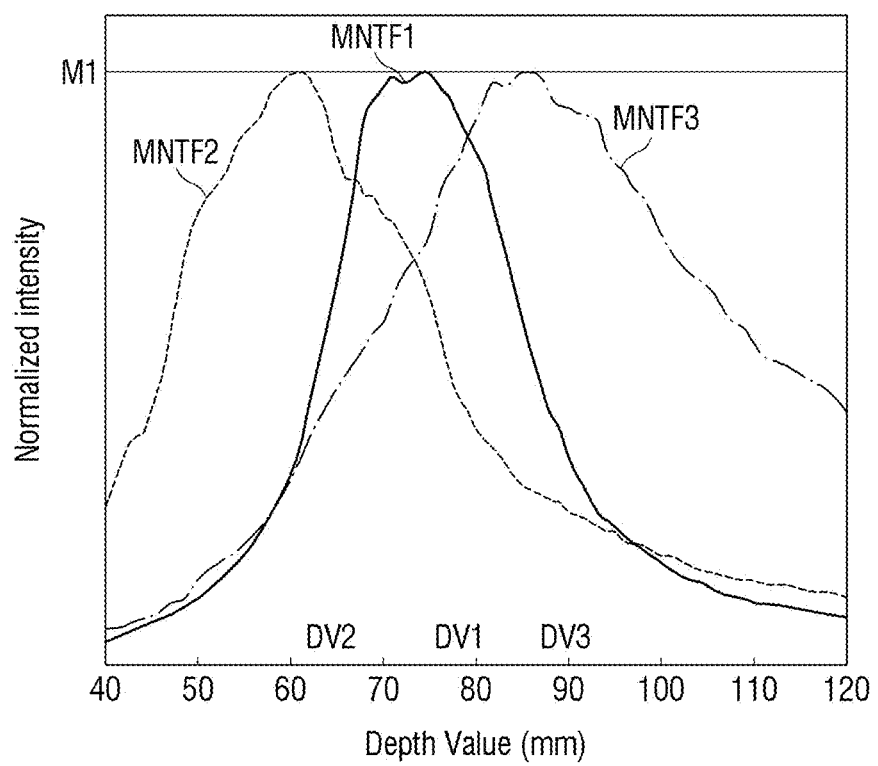
FIG. 20 is a graph illustrating modulated signals according to another exemplary embodiment.

FIG. 19 is a flowchart illustrating a method for calculating a modulated signal according to another exemplary embodiment. FIG. 20 is a graph illustrating modulated signals according to another exemplary embodiment.

Another exemplary embodiment of FIGS. 19 and 20 is substantially the same as an exemplary embodiment of FIG. 6 except that normalized modulated signals are generated by normalizing the modulated signals. Accordingly, differences between another exemplary embodiment of FIGS. 19 and 20 and an exemplary embodiment of FIG. 6 will be mainly described.

Referring to FIG. 19, the control unit 40 calculates the modulated signals by arranging the edge detection values of the edges calculated in each of the plurality of modulated image data TID according to the depth (S500). Another exemplary embodiment of FIG. 20 illustrates modulated signals corresponding to three objects OBJ having different depths of field, similar to an exemplary embodiment of FIG. 12. According to some embodiments, the control unit 40 may calculate first to third modulated signals MTF1 to MTF3 corresponding to the first to third objects. A description thereof is the same as an exemplary embodiment of FIG. 12, and will thus be omitted.

Accordingly, the control unit 40 may generate normal modulated signals by normalizing the modulated signals to have a maximum value of 1 (S600).

Referring further to FIG. 20, the control unit 40 may normalize amplitudes of the first to third modulated signals MTF1 to MTF3. For example, the control unit 40 may generate a first normal modulated signal MNFT1 by normalizing the first modulated signal MTF1 to have a maximum value of 1. Accordingly, the first modulated signal MTF1 may have a convex-up waveform. In some cases, the control unit 40 may calculate the maximum value of the first normal modulated signal MNFT1 as 1. For example, the control unit 40 may calculate a peak value of the first normal modulated signal MNFT1 as 1. Alternatively, the control unit 40 may calculate the greatest value of the first normal modulated signal MNFT1 as 1. Accordingly, the first normal modulated signal MNFT1 has a value smaller than the first maximum value M1 at a depth smaller than a first depth DV1 based on the first depth DV1 corresponding to a first maximum value M1. In addition, the first normal modulated signal MNFT1 has a value smaller than the first maximum value M1 at a depth greater than the first depth DV1. In addition, a method for generating a second normal modulated signal MNFT2 and a third normal modulated signal MNFT3 is substantially the same as the method for generating the first normal modulated signal MNFT1, and a description thereof will thus be omitted.

Accordingly, all of the maximum values of the first to third normal modulated signals MNFT3 may be 1. Since the control unit 40 calculates depths corresponding to the maximum values of the modulated signals as the depths of field of the objects OBJ, the control unit 40 may easily calculate the depths corresponding to the maximum values of the modulated signals by normalizing the modulated signals to generate the normal modulated signals.

Figure 21:
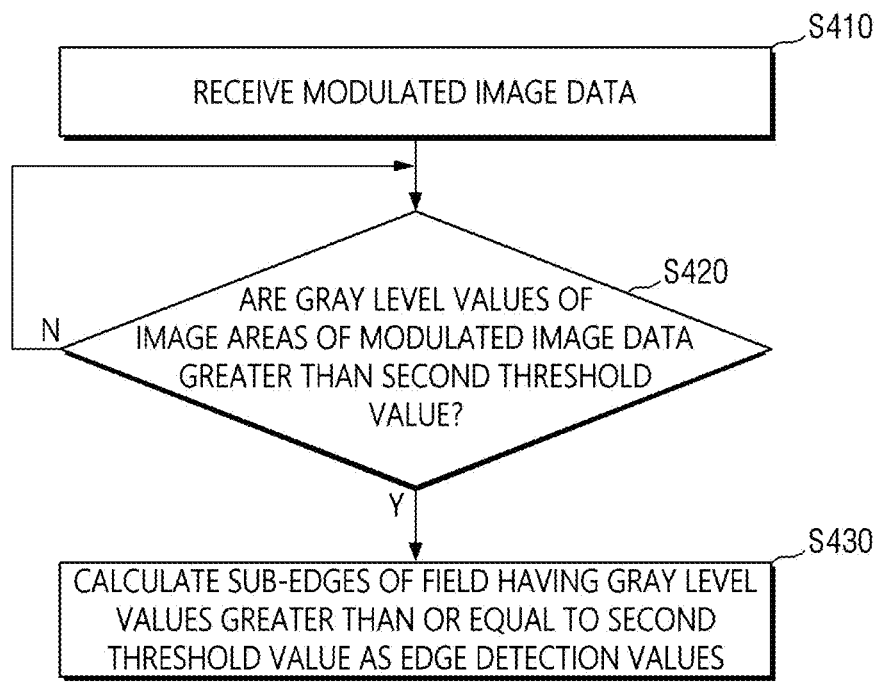
FIG. 21 is a flowchart illustrating a method for calculating an edge of a holographic camera according to another exemplary embodiment.

FIG. 21 is a flowchart illustrating a method for calculating an edge of a holographic camera according to another exemplary embodiment.

Referring to FIG. 21, first, the control unit 40 receives modulated image data (S410). Then, the control unit 40 determines whether or not gray level values of image areas of the modulated image data are greater than a second threshold value (S420).

The control unit 40 may receive a plurality of modulated image data TID. Specifically, each of the modulated image data may include a plurality of image areas. The plurality of image areas may include gray level values, respectively. For example, each of the plurality of modulated image data TID may include image areas having the respective gray level values. Accordingly, the control unit 40 may determine whether or not a gray level value of at least one image area of the modulated image data is greater than the second threshold value. In some cases, the second threshold value may be greater than the first threshold value according to an exemplary embodiment of FIG. 15.

Finally, the control unit 40 calculates sub-edges of a field having gray level values greater than or equal to the second threshold value as edge detection values (S430).

The control unit 40 may calculate image areas having gray level values greater than the second threshold value as the sub-edges of the field. The sub-edges of the field may be adjacent to image areas having gray level values smaller than the second threshold value. The control unit 40 may calculate sub-edges in each of the first to N-th modulated image data TID1 to TIDn. A method for calculating the sub-edges by the control unit 40 is substantially the same as that of an exemplary embodiment of FIGS. 15 to 18, and a description thereof will thus be omitted.

Figure 22:
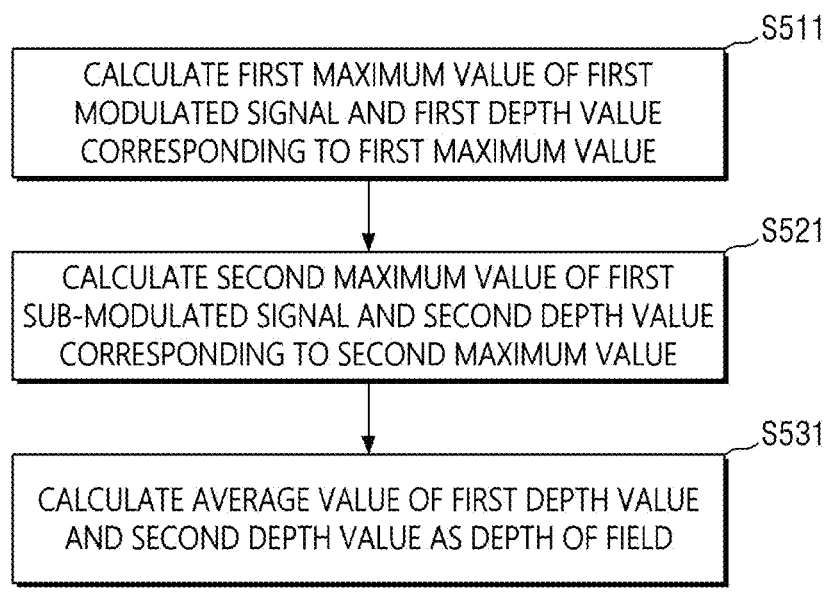
FIG. 22 is a flowchart illustrating a method for calculating an edge of a system according to another exemplary embodiment.
Figure 23:
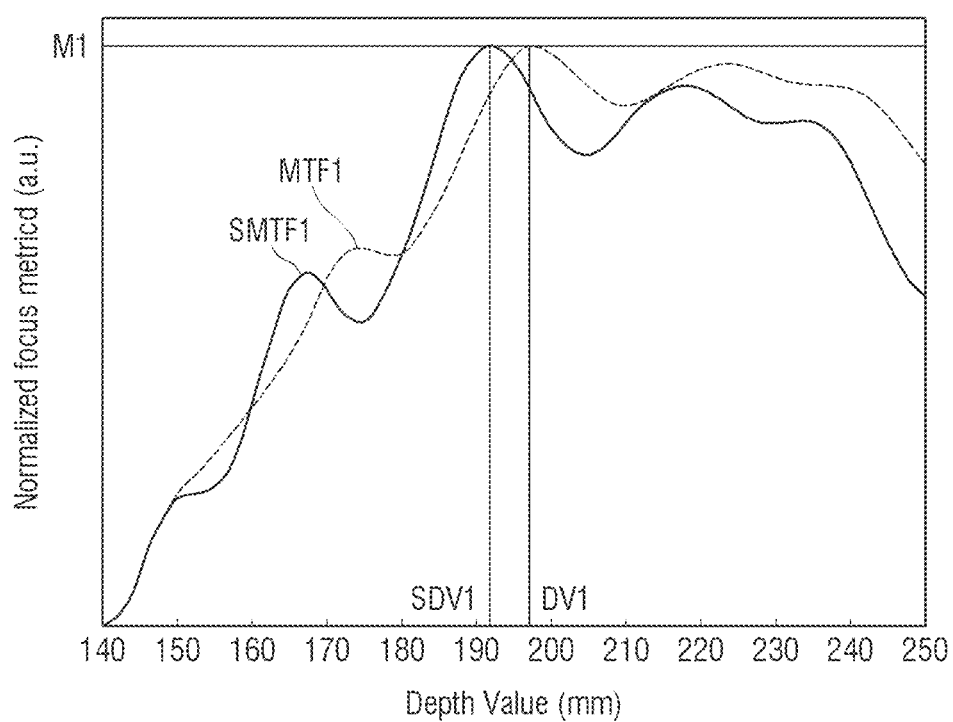
FIG. 23 is a graph illustrating modulated signals according to another exemplary embodiment.

FIG. 22 is a flowchart illustrating a method for calculating an edge of a system for measuring a depth of a stereoscopic image according to another exemplary embodiment. FIG. 23 is a graph illustrating modulated signals according to another exemplary embodiment.

Referring to FIG. 22, the control unit 40 calculates a first maximum value M1 and a first depth DV1 of the first modulated signal MTF1 (S511). For example, the first modulated signal MTF1 may have a convex-up waveform. A convex-up waveform may be a waveform where the curve slopes upward in a concave manner. For example, the first modulated signal MTF1 may have a concave wave. In some cases, the control unit 40 may calculate a peak value of the first modulated signal MTF1 as the first maximum value M1. Alternatively, the control unit 40 may calculate the greatest value of the first modulated signal MTF1 as the first maximum value M1. Accordingly, the first modulated signal MTF1 has a value smaller than the first maximum value M1 at a depth smaller than a first depth DV1 on the basis of the first depth DV1 corresponding to the first maximum value M1. In addition, the first modulated signal MTF1 has a value smaller than the first maximum value M1 at a depth greater than the first depth DV1. As another example, the control unit 40 may calculate a point at which a differential value of the first modulated signal MTF1 becomes 0 as the first maximum value M1 of the first modulated signal MTF1. In some cases, the point at which the differential value of the first modulated signal MTF1 becomes 0 may be the same as a point at which the first modulated signal MTF1 has a peak value. In addition, the control unit 40 may calculate the first depth DV1 corresponding to the first maximum value M1.

Next, the control unit 40 calculates a second maximum value M2 and a second depth DV2 of a first sub-modulated signal SMTF1 (S521). When the control unit 40 calculates the sub-edges of the field as in another exemplary embodiment of FIG. 21, the control unit 40 may calculate the first sub-modulated signal SMTF1 by sequentially arranging the sub-edges of the field calculated in each of the first to N-th modulated image data according to a depth.

For example, the first sub-modulated signal SMTF1 may have a convex-up waveform. In some cases, the control unit 40 may calculate a peak value of the first sub-modulated signal SMTF1. Alternatively, the control unit 40 may calculate the greatest value of the first sub-modulated signal SMTF1. Accordingly, the first sub-modulated signal SMTF1 has a value smaller than the maximum value at a depth smaller than the second depth DV2 based on the second depth DV2 corresponding to the maximum value. In addition, the second modulated signal MTF2 has a value smaller than the maximum value at a depth greater than the second depth DV2. As another example, the control unit 40 may calculate a point at which a differential value of the first sub-modulated signal SMTF1 becomes 0 as the second maximum value M2 of the first sub-modulated signal SMTF1. In some cases, the point at which the differential value of the first sub-modulated signal SMTF1 becomes 0 may be the same as a point at which the first sub-modulated signal SMTF1 has a peak value. In addition, the control unit 40 may calculate the second depth DV2 corresponding to the second maximum value M2.

Referring further to FIG. 23, the first sub-modulated signal SMTF1 may have a waveform different from that of the first modulated signal MTF1. When the control unit 40 calculates areas having the gray level values greater than or equal to the second threshold value as the sub-edges and generates the first sub-modulated signal SMTF1 based on the sub-edges as in a case of FIG. 21, the second threshold value is different from the first threshold value, and thus, the first modulated signal MTF1 may have a waveform different from that of the first sub-modulated signal SMTF1.

For example, the first maximum value M1 of the first modulated signal MTF1 and a maximum value of the first sub-modulated signal SMTF1 may be the same. However, the first depth DV1 of the first modulated signal MTF1 may be different from a second depth DV2 of a second sub-modulated signal. Alternatively, the first depth DV1 of the first modulated signal MTF1 may be greater than a second depth DV2 of a second sub-modulated signal.

Finally, the control unit 40 may calculate an average value of the first depth DV1 and the second depth DV2 as the depth of field of the object 10 (S531).

The control unit 40 may calculate the depth of field of the object 10 based on the first modulated signal MTF1 and the first sub-modulated signal SMTF1. For example, when the first depth DV1 of the first modulated signal MTF1 and the second depth DV2 of the first sub-modulated signal SMTF1 are the same, the average value of the first depth DV1 and the second depth DV2 is also the same as the first depth DV1 or the second depth DV2. Accordingly, the control unit 40 may calculate the average value of the first depth DV1 and the second depth DV2 as the depth of field of the object 10. In an embodiment, when the first depth DV1 of the first modulated signal MTF1 and the second depth DV2 of the first sub-modulated signal SMTF1 are different, it may indicate that there is noise or a measurement error present in the signals. Accordingly, the control unit 40 may accurately calculate the depth of field of the object 10 by calculating the average value of the first depth DV1 and the second depth DV2 as the depth of field of the object 10.

Also in a case of the system for measuring a depth of a stereoscopic image according to the present exemplary embodiment, the holographic camera 30 may capture an image of the object 10 to obtain a modulated signal, and analyze the modulated signal to calculate the depth of field of the object 10.

What is claimed is:

1. A system for measuring a depth of a stereoscopic image, comprising:
    a display device displaying a stereoscopic image at a predetermined depth of field in a three-dimensional space, wherein the stereoscopic image has a plurality of depths in the three-dimensional space;
    a holographic camera generating an interference pattern image by sensing a wavelength and a phase of light of the stereoscopic image; and
    a control unit calculating a plurality of modulated image data having image information of the stereoscopic image at each depth of the plurality of depths based on the wavelength and the phase of the light, calculating edges of a field in each of the plurality of modulated image data to obtain edge detection values, calculating a modulated signal by arranging the edge detection values according to a depth in the each of the plurality of modulated image data, calculating a first maximum value of the modulated signal, and calculating a first depth corresponding to the first maximum value as the depth of field.

2. The system of claim 1, wherein each of the plurality of modulated image data has a plurality of gray level values, and
the control unit calculates the edges of the field by calculating gray level values having a value greater than or equal to a first threshold value as the edge detection values in each of the plurality of modulated image data.

3. The system of claim 2, wherein at least one of the plurality of modulated image data has three or more gray level values.

4. The system of claim 2, wherein the control unit further calculates sub-edges of the field by calculating gray level values having a value greater than or equal to a second threshold value different from the first threshold value as sub-edge detection values in each of the plurality of modulated image data.

5. The system of claim 4, wherein the second threshold value is greater than the first threshold value.

6. The system of claim 4, wherein the control unit further calculates a sub-modulated signal by arranging the gray level values of the sub-edges according to the depth.

7. The system of claim 6, wherein the control unit calculates a second maximum value of the sub-modulated signal, and calculates an average value of a second depth corresponding to the second maximum value and the first depth as the depth of field.

8. The system of claim 2, wherein the control unit calculates the modulated signal by sequentially arranging the gray level values of the edges according to the depth.

9. The system of claim 1, wherein each of the modulated image data includes a plurality of image areas each having gray level values, and
in case that a gray level value of at least one image area of the plurality of image areas is greater than or equal to a first threshold value, the control unit calculates the at least one image area as the edge.

10. The system of claim 9, wherein the edge is adjacent to an image area in which the gray level value of the at least one image area of the plurality of image areas is smaller than or equal to the first threshold value.

11. The system of claim 1, wherein the control unit normalizes the modulated signal so that the first maximum value of the modulated signal is 1, and calculates the first maximum value as 1, and
the control unit calculates a depth allowing depth of field to be 1.

12. The system of claim 1, wherein the holographic camera comprises:
an image sensor obtaining the interference pattern image in a plurality of divided light receiving areas of the image sensor; and
a micro polarizer array disposed so that linearly polarized light having different phases is received for each of the plurality of divided light receiving areas of the image sensor.

13. The system of claim 12, wherein the micro polarizer array includes a plurality of polarizers, and
each of the plurality of polarizers is arranged to correspond to each of the plurality of divided light receiving areas of the image sensor and converts transmitted light into linearly polarized light.

14. The system of claim 13, wherein light transmission axes of the respective polarizers are formed to have different angles, such that linearly polarized light passing through the respective polarizers has different phases.

15. A method for measuring a depth of a stereoscopic image, comprising:
obtaining an interference pattern image by sensing a wavelength and a phase of light according to a depth of a plurality of depths of a stereoscopic image displayed at a predetermined depth of field in a three-dimensional space;
calculating a plurality of modulated image data having image information of the stereoscopic image for each depth of the plurality of depths based on the wavelength and the phase of the light of the interference pattern image;
calculating edges in each of the plurality of modulated image data to obtain edge detection values;
calculating a modulated signal by arranging the edge detection values according to a depth in the each of the plurality of modulated image data;
calculating a first maximum value of the modulated signal; and
calculating a first depth corresponding to the first maximum value as the depth of field.

16. The method of claim 15, wherein the calculating of the first maximum value of the modulated signal comprises:
normalizing the modulated signal so that the first maximum value of the modulated signal is 1; and
calculating the first maximum value as 1.

17. The method of claim 15, wherein in the calculating of the edges in each of the plurality of modulated image data,
each of the plurality of modulated image data has a plurality of gray level values, and
the edges of the field are calculated by calculating gray level values having a value greater than or equal to a first threshold value as the edge detection values in each of the plurality of modulated image data.

18. The method of claim 17, wherein in the calculating of the edges in each of the plurality of modulated image data,
sub-edges of the field are further calculated by calculating gray level values having a value greater than or equal to a second threshold value different from the first threshold value as sub-edge detection values in each of the plurality of modulated image data.

19. The method of claim 18, wherein in the calculating of the modulated signal by arranging the edge detection values of the edges according to the depth,
the modulated signal is calculated by ordering the gray level values of the edges according to corresponding depths, and
a sub-modulated signal is further calculated by ordering the gray level values of the sub-edges according to the corresponding depths.

20. The method of claim 19, further comprising:
calculating a second maximum value of the sub-modulated signal; and
calculating an average value of a second depth corresponding to the second maximum value and calculating the first depth as the depth of field.

* * * * *